US012795671B2

(12) United States Patent
Liu et al.

(10) Patent No.: US 12,795,671 B2
(45) Date of Patent: Nov. 10, 2026

(54) SYSTEM AND METHOD FOR UPLINK CONTROL INFORMATION TRANSMISSION USING A PHYSICAL UPLINK CONTROL CHANNEL

(71) Applicant: Huawei Technologies Co., Ltd., Shenzhen (CN)

(72) Inventors: Rongkuan Liu, Shanghai (CN); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 382 days.

(21) Appl. No.: 18/477,540

(22) Filed: Sep. 28, 2023

(65) Prior Publication Data

US 2024/0040573 A1 Feb. 1, 2024

Related U.S. Application Data

(63) Continuation of application No. PCT/CN2022/085181, filed on Apr. 2, 2022.

(30) Foreign Application Priority Data

Apr. 6, 2021 (CN) ......................... 202110369481.3

(51) Int. Cl.
*H04W 72/21* (2023.01)
*H04L 1/00* (2006.01)
*H04W 72/0453* (2023.01)

(52) U.S. Cl.
CPC ........... *H04W 72/21* (2023.01); *H04L 1/0061* (2013.01); *H04W 72/0453* (2013.01)

(58) Field of Classification Search
CPC ..................................................... H04W 72/21
See application file for complete search history.

(56) References Cited

U.S. PATENT DOCUMENTS 11,064,471 B2 * 7/2021 Choi ..................... H04L 1/1887
2005/0238108 A1 * 10/2005 Suh ....................... H04L 1/0015
375/260

(Continued)

FOREIGN PATENT DOCUMENTS

WO 2019001523 A1 1/2019
WO WO-2020027535 A1 * 2/2020 ............ H04W 74/08

OTHER PUBLICATIONS

Moderator (Ericsson): "FL Summary 4 for Enhancements for PUCCH formats 0/1/4", 3GPP TSG-RAN Meeting #104-e, R1-2102127, Jan. 25-Feb. 5, 2021 (2021-02-085, XP051977714, total 40 pages.

(Continued)

*Primary Examiner* — Guang W Li
(74) *Attorney, Agent, or Firm* — Slater Matsil, LLP

(57) ABSTRACT

This application provides an information transmission method, an apparatus, and a system, to improve coverage and transmission reliability that are of uplink control information UCI, thereby improving communication efficiency. In the method, after determining UCI, a terminal device sends the uplink control information on N frequency domain resource units, where N is a positive integer greater than 1. Based on this solution, when a power spectral density is determined, a larger quantity of frequency domain resource units may indicate a higher transmit power, so that coverage of the UCI can be increased. In addition, when a quantity of bits of the UCI is small, rate matching may be performed on the N frequency domain resource units, to reduce a code rate, so that transmission reliability is improved.

24 Claims, 12 Drawing Sheets

(56) References Cited

U.S. PATENT DOCUMENTS

| | | | | |
|---|---|---|---|---|
| 2018/0175993 | A1* | 6/2018 | Onggosanusi | H04B 7/0486 |
| 2019/0045536 | A1 | 2/2019 | Gao et al. | |
| 2019/0150143 | A1* | 5/2019 | Yin | H04L 5/0053 370/329 |
| 2020/0077424 | A1* | 3/2020 | Baldemair | H04W 72/0453 |
| 2020/0178248 | A1 | 6/2020 | Wen et al. | |
| 2020/0274655 | A1* | 8/2020 | Zhao | H04L 5/0055 |
| 2020/0328866 | A1 | 10/2020 | Du et al. | |
| 2021/0315000 | A1* | 10/2021 | Li | H04W 72/21 |
| 2022/0116953 | A1* | 4/2022 | Kim | H04W 72/21 |
| 2022/0338210 | A1* | 10/2022 | Elgarisi | H04L 1/1671 |
| 2022/0346085 | A1* | 10/2022 | Hu | H04L 5/0053 |
| 2023/0179348 | A1* | 6/2023 | Seok | H04L 5/1469 370/280 |
| 2024/0040573 | A1* | 2/2024 | Liu | H04L 1/0013 |
| 2025/0365734 | A1* | 11/2025 | Choi | H04W 72/0466 |

OTHER PUBLICATIONS

ETSI TS 138 212 V15.3.0 (Oct. 2018) "5G; NR; Multiplexing and channel coding (3GPP TS 38.212 version 15.3.0 Release 15)", total 102 pages.

* cited by examiner

SYSTEM AND METHOD FOR UPLINK CONTROL INFORMATION TRANSMISSION USING A PHYSICAL UPLINK CONTROL CHANNEL

CROSS-REFERENCE TO RELATED APPLICATIONS

This application is a continuation of International Application No. PCT/CN2022/085181, filed on Apr. 2, 2022, which claims priority to Chinese Patent Application No. 202110369481.3, filed on Apr. 6, 2021. The disclosures of the aforementioned applications are hereby incorporated by reference in their entireties.

TECHNICAL FIELD

This application relates to the communications field, and in particular, to an information transmission method, an apparatus, and a system.

BACKGROUND

A terminal device may usually transmit uplink control information (UCI) in a plurality of physical uplink control channel (PUCCH) formats (PUCCH formats). The UCI may include one or more of hybrid automatic repeat request acknowledgment (HARQ-ACK) information, channel state information (CSI), or a scheduling request (SR).

Currently, a new radio (NR) standard defines five PUCCH formats: PUCCH formats 0, 1, 2, 3, and 4. In the NR standards release (R) 15 and R16, the following stipulations are made for the PUCCH format 4 (PF 4 for short below): 4 to 14 symbols are occupied in time domain, and one resource block (RB) is occupied in frequency domain; information including more than two bits is carried; and a sum of a quantity of bits of the UCI and a quantity of bits of a cyclic redundancy check code (CRC) does not exceed 115 when the UCI includes the CSI.

Based on the foregoing stipulations, because the RB is occupied for the PF 4 in frequency domain, in some scenarios, a power spectral density (PSD) is constrained, and a transmit power of the terminal device is limited. Consequently, coverage of a PUCCH is limited.

SUMMARY

This application provides an information transmission method, an apparatus, and a system, to improve coverage of UCI, thereby improving communication efficiency.

To achieve the foregoing objective, this application provides following technical solutions.

According to a first aspect, an information transmission method is provided. The method may be performed by a terminal device, may be performed by a component of the terminal device, for example, a processor, a chip, or a chip system of the terminal device, or may be implemented by a logic module or software that can implement all or a part of functions of the terminal device. The method includes: determining uplink control information UCI, and sending the UCI to a network device on N frequency domain resource units, where N is a positive integer greater than 1.

Based on this solution, in this application, the UCI is sent by using the N frequency domain resource units. When a power spectral density is determined, a larger quantity of frequency domain resource units may indicate a higher transmit power. Because the frequency domain resource units for sending the UCI are increased in this application, the transmit power of the terminal device can be increased, so that coverage of the UCI is improved. In addition, because the frequency domain resource units for sending the UCI are increased in this application, when a quantity of bits of the UCI that are carried on each frequency domain resource unit has a threshold, more bits of the UCI can be carried on the N frequency domain resource units. When a data volume of CSI is large, feedback efficiency of the CSI can be improved, so that communication efficiency is improved. In addition, when a quantity of bits of the UCI is small, rate matching may be performed on the N frequency domain resource units, to reduce a code rate, so that transmission reliability is improved.

With reference to the first aspect, in some implementations of the first aspect, the UCI includes N UCI subsegments, and different UCI subsegments in the N UCI subsegments are carried by different frequency domain resource units in the N frequency domain resource units.

Based on this implementation, the UCI is divided into the N UCI subsegments to be transmitted on the N frequency domain resource units, to decrease a quantity of bits of the UCI that are transmitted on each frequency domain resource unit, so that a redundant bit can be added, that is, a code rate can be reduced, and transmission reliability can be improved. In addition, compared with one frequency domain resource unit, the N frequency domain resource units can be for transmitting more UCI. When the UCI includes the CSI, and the data volume of the CSI is large, all data of the CSI may be fed back to the network device through one time of sending, to improve feedback timeliness of the CSI, so that communication efficiency is improved. In addition, the UCI is divided into the N UCI subsegments. When a part of the N UCI subsegments are successfully transmitted, the network device may obtain a part of the UCI, and the terminal device may retransmit a part that fails to be transmitted, and does not need to retransmit all of the UCI, so that resource overheads can be reduced.

With reference to the first aspect, in some implementations of the first aspect, a sum of a quantity of bits of the UCI subsegment and a quantity of bits of a cyclic redundancy check code CRC corresponding to the UCI subsegment is less than or equal to a first threshold, and the first threshold is a maximum quantity of bits that can be carried by the frequency domain resource unit. Based on this implementation, a bit carried on the frequency domain resource unit can be enabled to not exceed a maximum carrying capability of the frequency domain resource unit, to reduce an error, and improve transmission efficiency.

With reference to the first aspect, in some implementations of the first aspect, the sending the UCI on N frequency domain resource units includes: performing physical-layer processing on the N UCI subsegments to obtain N first modulation symbols; and mapping the N first modulation symbols to the N frequency domain resource units, and sending the N first modulation symbols, where the physical-layer processing includes rate matching, and the rate matching is based on one frequency domain resource unit.

Based on this implementation, physical-layer processing can be performed on the UCI segment by segment, and processing latency can be reduced when physical-layer processing on all subsegments is performed in parallel.

With reference to the first aspect, in some implementations of the first aspect, the UCI is mapped to the N frequency domain resource units X times, where X is a positive integer greater than 1. Based on this implementation, the UCI can be sent a plurality of times, to improve transmission reliability of the UCI.

With reference to the first aspect, in some implementations of the first aspect, X is equal to N, a quantity of bits of the UCI is A, and the sending the UCI on N frequency domain resource units includes: performing physical-layer processing on the A-bit UCI to obtain a second modulation symbol; and separately mapping the second modulation symbol to each of the N frequency domain resource units, and sending the second modulation symbol, where the physical-layer processing includes rate matching, and the rate matching is based on one frequency domain resource unit.

Based on this implementation, the UCI is mapped to the frequency domain resource units N times through duplication of the modulation symbol in frequency domain. In a frequency selective channel, receiving reliability can be improved, so that communication efficiency is improved.

With reference to the first aspect, in some implementations of the first aspect, X is equal to N, a quantity of bits of the UCI is A, and the sending the UCI on N frequency domain resource units includes: performing physical-layer processing on N pieces of A-bit UCI to obtain N third modulation symbols; and mapping the N third modulation symbols to the N frequency domain resource units, and sending the N third modulation symbols, where the physical-layer processing includes rate matching, the rate matching is based on one frequency domain resource unit, and the N pieces of A-bit UCI is obtained by duplicating the A-bit UCI.

Based on this implementation, the UCI is mapped to the frequency domain resource units N times, or in other words, is repeated N−1 times, through duplication of the UCI. In a frequency selective channel, receiving reliability can be improved, so that communication efficiency is improved.

With reference to the first aspect, in some implementations of the first aspect, a sum of the quantity of bits of the UCI and a quantity of bits of a CRC corresponding to the UCI is less than or equal to a first threshold, and the first threshold is a maximum quantity of bits that can be carried by the frequency domain resource unit.

Based on this implementation, a bit carried on the frequency domain resource unit can be enabled to not exceed a maximum carrying capability of the frequency domain resource unit, to reduce an error, and improve transmission efficiency.

With reference to the first aspect, in some implementations of the first aspect, a quantity of bits of the UCI is A, and the sending the UCI on N frequency domain resource units includes: performing physical-layer processing on first UCI to obtain a fourth modulation symbol; and mapping the fourth modulation symbol to the N frequency domain resource units, and sending the fourth modulation symbol, where the physical-layer processing includes rate matching, the rate matching is based on the N frequency domain resource units, the first UCI is obtained by duplicating the A-bit UCI, and the first UCI includes A times X bits.

Based on this implementation, the UCI is mapped to the frequency domain resource units X times, or in other words, is repeated X−1 times, through duplication of the UCI. In a frequency selective channel, transmission reliability can be improved, so that communication efficiency is improved.

With reference to the first aspect, in some implementations of the first aspect, a sum of the quantity of bits of the first UCI and a quantity of bits of a CRC corresponding to the first UCI is less than or equal to a second threshold; or a sum of the quantity of bits of the first UCI and a quantity of bits of a CRC corresponding to the first UCI is less than or equal to a smaller value in a second threshold and a third threshold, where the second threshold is determined based on one or more of the following: N, a quantity of subcarriers included in the frequency domain resource unit, a spreading factor corresponding to a first PUCCH format, a time unit quantity corresponding to the first PUCCH format, a modulation scheme corresponding to the first PUCCH format, or a first code rate, the first PUCCH format is a PUCCH format used when the UCI is sent, the first code rate is a code rate configured by the network device, and the third threshold is a preset threshold or a threshold configured by the network device.

Based on this implementation, a bit carried on the N frequency domain resource units can be enabled to not exceed a maximum carrying capability of the N frequency domain resource units, to reduce an error, and improve transmission efficiency.

With reference to the first aspect, in some implementations of the first aspect, the second threshold, N, the quantity of subcarriers included in the frequency domain resource unit, the spreading factor corresponding to the first PUCCH format, the time unit quantity corresponding to the first PUCCH format, the modulation scheme corresponding to the first PUCCH format, and the first code rate satisfy the following formula:

$$Thr_2 = N \cdot N_{sc,ctrl} \cdot N_{symb,UCI}^{PUCCH} \cdot Q_m \cdot r, \text{ where}$$

$Thr_2$ is the second threshold, $$N_{sc,ctrl} = N_{sc}/N_{SF}^{PUCCH}, N_{sc}$$

is the quantity of subcarriers included in the frequency domain resource unit, $$N_{SF}^{PUCCH}$$

is the spreading factor corresponding to the first PUCCH format $$N_{symb,UCI}^{PUCCH}$$

is the time unit quantity corresponding to the first PUCCH format, $Q_m$ is related to the modulation scheme corresponding to the first PUCCH format, and r is the first code rate.

With reference to the first aspect, in some implementations of the first aspect, the information transmission method further includes: receiving first indication information from the network device, where the first indication information indicates a value of X.

Based on this implementation, the value of X may be configured by the network device, or may be determined by the terminal device based on a related configuration of the network device, to improve transmission flexibility of the UCI.

With reference to the first aspect, in some implementations of the first aspect, a quantity of bits of the UCI is A, and the sending the UCI on N frequency domain resource units includes: performing physical-layer processing on the A-bit UCI to obtain a fifth modulation symbol; and mapping the fifth modulation symbol to the N frequency domain resource units, and sending the fifth modulation symbol, where the physical-layer processing includes rate matching, and the rate matching is based on the N frequency domain resource units.

Based on this implementation, one piece of UCI is sent on N frequency domain resources. During the rate matching, a redundant bit may be added to reduce a code rate, and transmission reliability can be improved, so that communication efficiency is improved.

With reference to the first aspect, in some implementations of the first aspect, the information transmission method further includes: receiving second indication information from the network device, where the second indication information indicates that a quantity of frequency domain resource units for carrying the UCI is not less than N.

Based on this implementation, it can be ensured that the terminal device still sends the UCI by using the N frequency domain resource units when the quantity of bits of the UCI is small, to reduce a code rate, and ensure transmission reliability.

With reference to the first aspect, in some implementations of the first aspect, a value of N is a preset value; or the information transmission method further includes: receiving third indication information from the network device, where the third indication information indicates a value of N.

According to a second aspect, an information transmission method is provided. The method may be performed by a network device, may be performed by a component of the network device, for example, a processor, a chip, or a chip system of the network device, or may be implemented by a logic module or software that can implement all or a part of functions of the network device. The method includes: receiving a signal from a terminal device on N frequency domain resource units, where N is a positive integer greater than 1; and performing physical-layer processing on the signal to obtain uplink control information UCI. For technical effects brought by the second aspect, refer to the technical effects brought by the first aspect. Details are not described herein again.

With reference to the second aspect, in some implementations of the second aspect, the UCI includes N UCI subsegments, and different UCI subsegments in the N UCI subsegments are carried by different frequency domain resource units in the N frequency domain resource units.

With reference to the second aspect, in some implementations of the second aspect, a sum of a quantity of bits of the UCI subsegment and a quantity of bits of a cyclic redundancy check code CRC corresponding to the UCI subsegment is less than or equal to a first threshold, and the first threshold is a maximum quantity of bits that can be carried by the frequency domain resource unit.

With reference to the second aspect, in some implementations of the second aspect, the signal is a first signal, the first signal includes N first modulation symbols, and the first modulation symbol is a modulation symbol corresponding to the UCI subsegment.

With reference to the second aspect, in some implementations of the second aspect, the UCI is mapped to the N frequency domain resource units X times, where X is a positive integer greater than 1.

With reference to the second aspect, in some implementations of the second aspect, the signal is a second signal, X is equal to N, a quantity of bits of the UCI is A, the second signal includes N second modulation symbols, and the second modulation symbol is a modulation symbol corresponding to the A-bit UCI.

With reference to the second aspect, in some implementations of the second aspect, the signal is a third signal, X is equal to N, a quantity of bits of the UCI is A, the third signal includes N third modulation symbols, and the third modulation symbol is a modulation symbol corresponding to the A-bit UCI.

With reference to the second aspect, in some implementations of the second aspect, a sum of the quantity of bits of the UCI and a quantity of bits of a CRC corresponding to the UCI is less than or equal to a first threshold, and the first threshold is a maximum quantity of bits that can be carried by the frequency domain resource unit.

With reference to the second aspect, in some implementations of the second aspect, the signal is a fourth signal, a quantity of bits of the UCI is A, the fourth signal includes a fourth modulation symbol, the fourth modulation symbol is a modulation symbol corresponding to first UCI, the first UCI is obtained by duplicating the A-bit UCI, and the first UCI includes A times X bits.

With reference to the second aspect, in some implementations of the second aspect, a sum of the quantity of bits of the first UCI and a quantity of bits of a CRC corresponding to the first UCI is less than or equal to a second threshold; or a sum of the quantity of bits of the first UCI and a quantity of bits of a CRC corresponding to the first UCI is less than or equal to a smaller value in a second threshold and a third threshold, where the second threshold is determined based on one or more of the following: N, a quantity of subcarriers included in the frequency domain resource unit, a spreading factor corresponding to a first PUCCH format, a time unit quantity corresponding to the first PUCCH format, a modulation scheme corresponding to the first PUCCH format, or a first code rate, the first PUCCH format is a PUCCH format used when the UCI is sent, the first code rate is a code rate configured by a network device, and the third threshold is a preset threshold or a threshold configured by the network device.

With reference to the second aspect, in some implementations of the second aspect, the second threshold, N, the quantity of subcarriers included in the frequency domain resource unit, the spreading factor corresponding to the first PUCCH format, the time unit quantity corresponding to the first PUCCH format, the modulation scheme corresponding to the first PUCCH format, and the first code rate satisfy the following formula:

$$Thr_2 = N \cdot N_{sc,ctrl} \cdot N_{symb,UCI}^{PUCCH} \cdot Q_m \cdot r, \text{ where}$$

$Thr_2$ is the second threshold, $$N_{sc,ctrl} = N_{sc}/N_{SF}^{PUCCH}, N_{sc}$$

is the quantity of subcarriers included in the frequency domain resource unit, $$N_{SF}^{PUCCH}$$

is the spreading factor corresponding to the first PUCCH format, $$N_{symb,UCI}^{PUCCH}$$

is the time unit quantity corresponding to the first PUCCH format, $Q_m$ is related to the modulation scheme corresponding to the first PUCCH format, and r is the first code rate.

With reference to the second aspect, in some implementations of the second aspect, the information transmission method further includes: sending first indication information to the terminal device, where the first indication information indicates a value of X.

With reference to the second aspect, in some implementations of the second aspect, the signal is a fifth signal, a quantity of bits of the UCI is A, the fifth signal includes a fifth modulation symbol, and the fifth modulation symbol is a modulation symbol corresponding to the A-bit UCI.

With reference to the second aspect, in some implementations of the second aspect, the information transmission method further includes: sending second indication information to the terminal device, where the second indication information indicates that a quantity of frequency domain resource units for carrying the UCI is not less than N.

With reference to the second aspect, in some implementations of the second aspect, a value of N is a preset value; or the information transmission method further includes: sending third indication information to the terminal device, where the third indication information indicates a value of N.

For technical effects brought by the implementations of the second aspect, refer to the technical effects brought by the corresponding implementations of the first aspect. Details are not described herein again.

According to a third aspect, a communication apparatus is provided to implement the foregoing methods. The communication apparatus may be the terminal device in the first aspect, an apparatus including the terminal device, or an apparatus included in the terminal device, for example, a chip. Alternatively, the communication apparatus may be the network device in the second aspect, an apparatus including the network device, or an apparatus included in the network device, for example, a chip. The communication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

In some possible designs, the communication apparatus may include a transceiver module and a processing module. The transceiver module may also be referred to as a transceiver unit, and is configured to implement the sending function and/or the receiving function in any one of the foregoing aspects and any one of the possible implementations of the foregoing aspects. The transceiver module may include a transceiver circuit, a transceiver, or a communication interface. The processing module may be configured to implement the processing function in any one of the foregoing aspects and any one of the possible implementations thereof.

In some possible designs, the transceiver module includes a sending module and a receiving module, respectively configured to implement the sending function and the receiving function in any one of the foregoing aspects and any one of the possible implementations thereof.

According to a fourth aspect, a communication apparatus is provided, and includes a processor and a memory. The memory is configured to store computer instructions. When the processor executes the instructions, the communication apparatus is enabled to perform the method in any one of the foregoing aspects. The communication apparatus may be the terminal device in the first aspect, an apparatus including the terminal device, or an apparatus included in the terminal device, for example, a chip. Alternatively, the communication apparatus may be the network device in the second aspect, an apparatus including the network device, or an apparatus included in the network device, for example, a chip.

According to a fifth aspect, a communication apparatus is provided, and includes a processor and a communication interface. The communication interface is configured to communicate with a module outside the communication apparatus. The processor is configured to execute a computer program or instructions, so that the communication apparatus performs the method in any one of the foregoing aspects. The communication apparatus may be the terminal device in the first aspect, an apparatus including the terminal device, or an apparatus included in the terminal device, for example, a chip. Alternatively, the communication apparatus may be the network device in the second aspect, an apparatus including the network device, or an apparatus included in the network device, for example, a chip.

According to a sixth aspect, a communication apparatus is provided, and includes a logic circuit and an interface circuit. The interface circuit is configured to obtain to-be-processed information and/or output processed information. The logic circuit is configured to perform the method in any one of the foregoing aspects, to process the to-be-processed information and/or generate the processed information. The communication apparatus may be the terminal device in the first aspect, an apparatus including the terminal device, or an apparatus included in the terminal device, for example, a chip. Alternatively, the communication apparatus may be the network device in the second aspect, an apparatus including the network device, or an apparatus included in the network device, for example, a chip.

With reference to the sixth aspect, in an implementation of the sixth aspect, when the communication apparatus is configured to implement the functions of the terminal device:

In some possible designs, the processed information is uplink control information UCI.

In some possible designs, the to-be-processed information is first indication information, and the first indication information indicates a value of X.

In some possible designs, the to-be-processed information is second indication information, and the second indication information indicates that a quantity of frequency domain resource units for carrying the UCI is not less than N.

With reference to the sixth aspect, in an implementation of the sixth aspect, when the communication apparatus is configured to implement the functions of the network device:

In some possible designs, the to-be-processed information is uplink control information UCI.

In some possible designs, the processed information is first indication information, and the first indication information indicates a value of X.

In some possible designs, the processed information is second indication information, and the second indication information indicates that a quantity of frequency domain resource units for carrying the UCI is not less than N.

According to a seventh aspect, a communication apparatus is provided, and includes at least one processor. The processor is configured to execute a computer program or instructions stored in a memory, so that the communication apparatus performs the method in any one of the foregoing aspects. The memory may be coupled to the processor, or may be independent of the processor. The communication apparatus may be the terminal device in the first aspect, an apparatus including the terminal device, or an apparatus included in the terminal device, for example, a chip. Alternatively, the communication apparatus may be the network device in the second aspect, an apparatus including the network device, or an apparatus included in the network device, for example, a chip.

According to an eighth aspect, a computer-readable storage medium is provided. The computer-readable storage medium stores instructions. When the instructions are run on a communication apparatus, the communication apparatus is enabled to perform the method in any one of the foregoing aspects.

According to a ninth aspect, a computer program product including instructions is provided. When the computer program product runs on a communication apparatus, the communication apparatus is enabled to perform the method in any one of the foregoing aspects.

According to a tenth aspect, a communication apparatus (where for example, the communication apparatus may be a chip or a chip system) is provided. The communication apparatus includes a processor, configured to implement the functions in any one of the foregoing aspects.

In some possible designs, the communication apparatus includes a memory. The memory is configured to store necessary program instructions and data.

In some possible designs, when the apparatus is the chip system, the apparatus may include a chip, or may include the chip and another discrete component.

It may be understood that, when the communication apparatus provided in any one of the third aspect to the tenth aspect is a chip, the sending action/function may be understood as information output, and the receiving action/function may be understood as information input.

For technical effects brought by any implementation of the third aspect to the tenth aspect, refer to the technical effects brought by different design manners of the first aspect or the second aspect. Details are not described herein again.

According to an eleventh aspect, a communication system is provided. The communication system includes the network device and the terminal device in the foregoing aspects.

DETAILED DESCRIPTION OF ILLUSTRATIVE EMBODIMENTS

To facilitate understanding of technical solutions in embodiments of this application, a related technology in this application is first briefly described as follows.

Figure 1A:
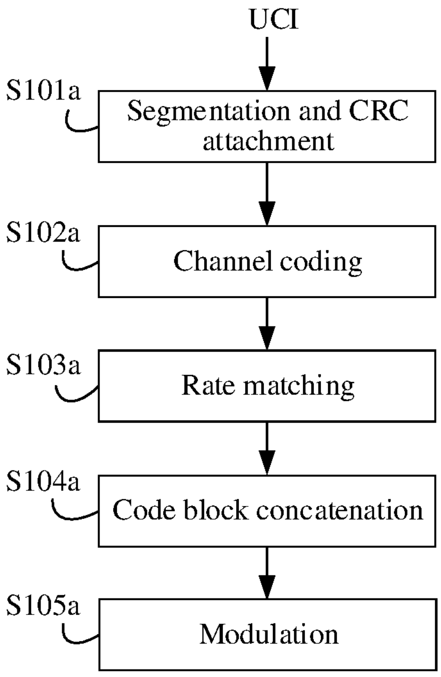
FIG. 1*a* is a schematic diagram of a physical-layer processing procedure performed by a terminal device on UCI according to this application.

1. Physical-Layer Processing Procedure of UCI:

For example, FIG. 1*a* shows a physical-layer processing procedure performed by a terminal device on UCI, and the procedure mainly includes the following steps.

S101*a*: Perform segmentation and CRC attachment.

One or more code blocks with error protection are obtained through segmentation and CRC attachment that are performed on the UCI.

S102*a*: Perform channel coding.

A unit of the channel coding is a code block, where the "code block" may also be referred to as a "coding block". The channel coding may enable a spectrum character of a data stream to adapt to a spectrum character of a channel, thereby minimizing an energy loss in a transmission process, increasing a ratio of signal energy to noise energy, reducing a possibility of an error, and improving communication reliability.

It may be understood that, in step S102*a*, channel coding is separately performed on the one or more code blocks obtained in step S101*a*. A code rate used during the channel coding may be understood as a reference code rate.

S103*a*: Perform rate matching.

A unit of the rate matching is a code block. The rate matching may mean that a bit on a channel is repeated (repeated) or punctured (punctured) to match a carrying capability of a physical channel and reach a bit rate required by a transmission format during channel mapping.

It may be understood that, in step S103*a*, rate matching is performed on each code block obtained through channel coding in step S102*a*.

S104*a*: Perform code block concatenation.

The code block concatenation may mean combining results obtained through rate matching performed on all code blocks in step S103*a*.

S105*a*: Perform modulation.

A modulation scheme may usually include binary phase shift keying (BPSK) and quadrature phase shift keying (QPSK) modulation. In addition, in some scenarios, the modulation scheme may further be quadrature amplitude modulation (QAM). Further, the QAM may be classified into 16QAM, 64QAM, 256QAM, and the like based on different modulation orders.

It may be understood that a modulation symbol may be obtained through adjustment of the rate matching results. Then, the obtained modulation symbol may be mapped to a transmission resource (for example, a PUCCH), so that a signal is finally generated, and is sent through an antenna.

Figure 1B:
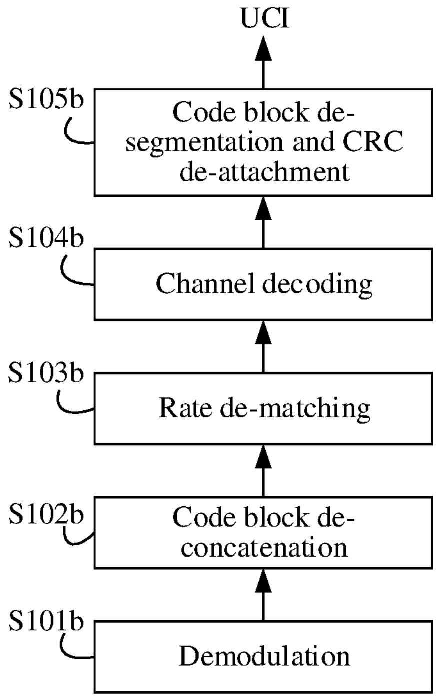
FIG. 1*b* is a schematic diagram of a physical-layer processing procedure performed by a network device on UCI according to this application.

For example, FIG. 1*b* shows a physical-layer processing procedure performed by a network device on UCI. The physical-layer processing process performed by the network device on the UCI is an inverse process of a terminal device, and mainly includes the following steps.

S101*b*: Perform demodulation.

After receiving, through an antenna, a signal sent by the terminal device, the network device demodulates the signal. It may be understood that the demodulation is an inverse process of modulation, and a demodulation scheme used by the network device corresponds to a modulation scheme used by the terminal device. For example, if the terminal device performs modulation by using QPSK, the network device performs demodulation by using a demodulation scheme corresponding to the QPSK.

S102*b*: Perform code block de-concatenation.

The network device may segment demodulated bits into one or more copies through code block de-concatenation (or in other words, de-concatenation).

S103*b*: Perform rate de-matching.

It may be understood that the rate de-matching is an inverse process of rate matching. A related parameter used when the terminal device performs rate matching may be configured by the network device or specified in a protocol, so that the network device can learn of a rate de-matching manner.

S104*b*: Perform channel decoding.

It may be understood that the channel decoding is an inverse process of channel coding. A manner in which the terminal device performs channel coding may be configured by the network device or specified in a protocol, so that the network device can learn of a channel decoding manner.

S105*b*: Perform code block de-segmentation and CRC de-attachment.

It may be understood that, after step S105*b* is completed, a physical layer of the network device obtains a bit of the UCI. Then, the physical layer of the network device may send the bit of the UCI to an upper layer (for example, a medium access control (MAC) layer), so that the upper layer processes the bit of the UCI.

As described above, in the NR standards R15 and R16, one RB is occupied for a PUCCH format 4 in frequency domain. There is a regulation constraint on signal sending in a shared frequency band (for example, 52.6 GHz to 71 GHz). For example, a regulation has a constraint on a PSD and a maximum transmit power. If the PUCCH format 4 in R15 and R16 continues to be used in the shared frequency band, the regulation constraint may limit a power used by a terminal device to send UCI on a PUCCH. Consequently, coverage of the UCI is limited. The shared frequency band may be referred to as an unlicensed frequency band. When the terminal device is far away from a network device, a problem that the UCI cannot be successfully received by the network device may be caused. Consequently, a scheduling request (SR) may not be processed in time, a downlink data receiving feedback (HARQ-ACK information) may not be timely, and feedback of CSI may not be timely. Consequently, a resource waste is caused, or communication efficiency is reduced.

In addition, the PUCCH format 4 defined in the NR standards R15 and R16 has a constraint on a maximum quantity of bits, and bits whose quantity is greater than the maximum quantity of bits under the constraint cannot be transmitted. When a data volume of the to-be-reported CSI of the terminal device is large, the CSI is segmented and transmitted a plurality of times. Consequently, the feedback of the CSI may not be timely or complete, and transmission efficiency of a system is affected.

Based on this, this application provides an information transmission method, to improve coverage and transmission reliability that are of UCI, and communication efficiency.

The following describes technical solutions in embodiments of this application with reference to the accompanying drawings in embodiments of this application.

In descriptions of this application, "/" represents an "or" relationship between associated objects unless otherwise specified. For example, A/B may represent A or B. In this application, "and/or" describes only an association relationship between associated objects and represents that three relationships may exist. For example, A and/or B may represent the following three cases: Only A exists, both A and B exist, and only B exists, where A and B may be singular or plural.

In descriptions of this application, unless otherwise specified, "a plurality of" means two or more than two. "At least one of the following" or a similar expression thereof means any combination of these items, and includes a singular item or any combination of plural items. For example, at least one of a, b, or c may represent a, b, c, a combination of a and b, a combination of a and c, a combination of b and c, or a combination of a, b, and c, where a, b, and c may be in a singular or plural form.

In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is for representing giving an example, an illustration, or a description. Any embodiment or design scheme described as "example" or "for example" in embodiments of this application should not be explained as being more preferred or having more advantages than another embodiment or design scheme. Exactly, use of the word such as "example" or "for example" is intended to present a relative concept in a specific manner for ease of understanding.

It may be understood that "an embodiment" mentioned in the whole specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments in any appropriate manner. It may be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

It may be understood that, in this application, "when" and "if" both mean that corresponding processing is performed in an objective situation, not intended to limit time, do not require the apparatus to necessarily have a determining action during implementation, and do not mean other limitation.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in embodiments of this application may also correspondingly implement these features or functions. Details are not described herein.

The technical solutions in embodiments of this application may be applied to various communication systems. The communication systems may be third generation partnership project (3GPP) communication systems, for example, a long term evolution (LTE) system, a 5th generation (5G) mobile communication system, an NR system, and a new radio vehicle to everything (NR V2X) system. Alternatively, the technical solutions may be applied to an LTE and 5G hybrid networking system, a device-to-device (D2D) communication system, a machine to machine (M2M) communication system, an internet of things (IoT), another next-generation communication system, or a non-3GPP communication system. This is not limited.

The technical solutions in embodiments of this application may be applied to various communication scenarios. For example, the technical solutions may be applied to one or more of the following communication scenarios: enhanced mobile broadband (eMBB), ultra-reliable low-latency communication (URLLC), machine type communication (MTC), massive machine-type communications (mMTC), D2D, V2X, IoT, and the like.

The foregoing communication systems and communication scenarios used in this application are merely examples for description, and communication systems and communication scenarios used in this application are not limited thereto. A general description is provided herein. Details are not described below again.

Figure 2:
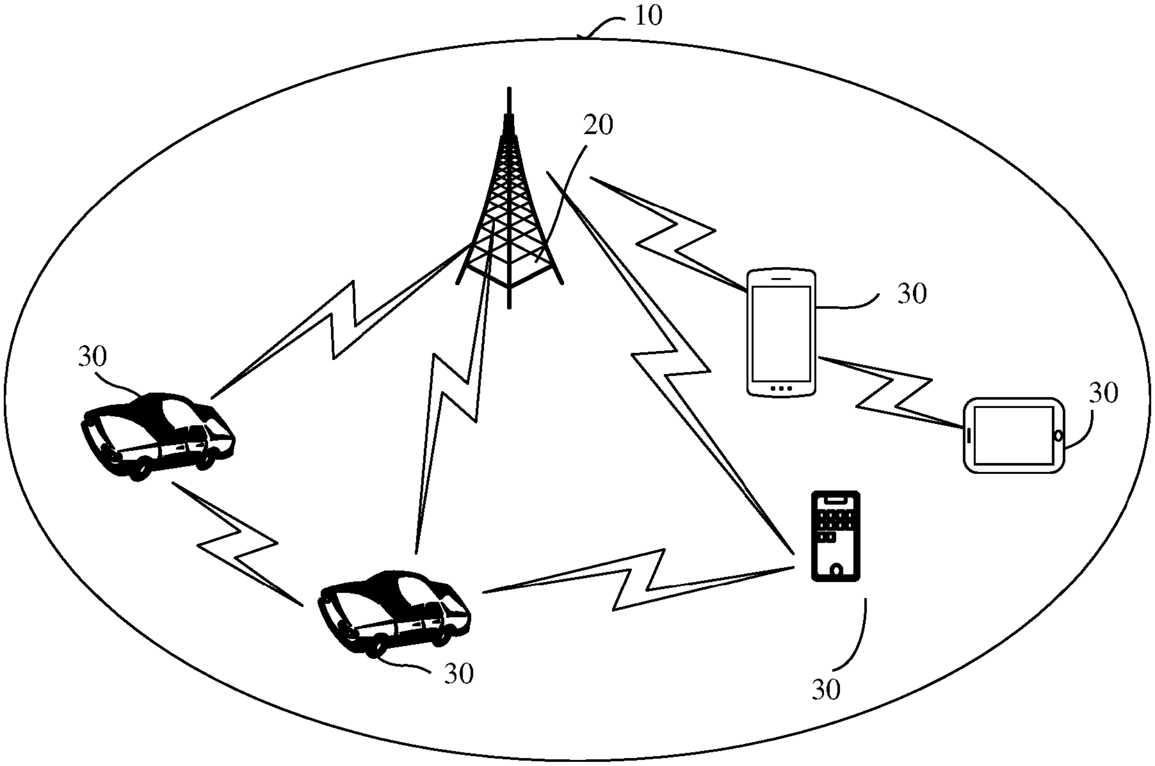
FIG. 2 is a schematic diagram of a structure of a communication system according to this application.

FIG. 2 shows a communication system 10 according to an embodiment of this application. The communication system 10 includes at least one network device 20 and one or more terminal devices 30 connected to the network device 20. Optionally, different terminal devices 30 may communicate with each other.

In some embodiments, the terminal device 30 in this application may also be referred to as user equipment (UE), a terminal, an access terminal, a subscriber unit, a subscriber station, a mobile station (MS), a remote station, a remote terminal, a mobile terminal (MT), a user terminal, a wireless communication device, a user agent, a user apparatus, or the like. The terminal device may be a wireless terminal or a wired terminal in an IoT, V2X, D2D, M2M, a 5G network, or a future evolved public land mobile network (PLMN). The wireless terminal may be a device with a wireless transceiver function. The wireless terminal may be deployed on a land, and includes an indoor device or an outdoor device, a hand-held device, or a vehicle-mounted device. The wireless terminal may also be deployed on water (for example, a ship). The wireless terminal may also be deployed in air (for example, an airplane, a balloon, and a satellite).

For example, the terminal device 30 may be an unmanned aerial vehicle, an IoT device (for example, a sensor, an electricity meter, or a water meter), a V2X device, a station (ST) in a wireless local area network (WLAN), a cellular phone, a cordless phone, a session initiation protocol (SIP) phone, a wireless local loop (WLL) station, a personal digital assistant (PDA) device, a handheld device with a wireless communication function, a computing device, another processing device connected to a wireless modem, a vehicle-mounted device, a wearable device (which may also be referred to as a wearable intelligent device), a tablet computer, a computer with a wireless transceiver function, a virtual reality (VR) terminal, a wireless terminal in industrial control, a wireless terminal in self driving (self-driving), a wireless terminal in telemedicine, a wireless terminal in a smart grid, a wireless terminal in transportation security, a wireless terminal in a smart city, a wireless terminal in a smart home, a vehicle-mounted terminal, a vehicle having a vehicle-to-vehicle (V2V) communication capability, intelligent connected vehicles, an unmanned aerial vehicle having an unmanned aerial vehicle to unmanned aerial vehicle (UAV to UAV, U2U) communication capability, or the like. The terminal may be mobile or at a fixed position. This is not specifically limited in this application.

In some embodiments, the network device 20 in this application is a device for connecting the terminal device 30 to a wireless network, and may be an evolved NodeB (eNB or eNodeB) in an LTE or LTE-advanced (LTE-A) system, for example, a conventional macro eNodeB eNB and a micro eNodeB eNB in a heterogeneous network scenario; may be a next generation NodeB (gNodeB or gNB) in a 5G system; may be a transmission reception point (TRP); may be a base station in a future evolved PLMN; may be a broadband network gateway (BNG), an aggregation switch, or a non-3GPP access device; may be a radio controller in a cloud radio access network (CRAN); may be an access point (AP) in a Wi-Fi system; may be a radio relay node or a radio backhaul node; or may be a device for implementing a base station function in IoT, a device for implementing the base station function in V2X, a device for implementing the base station function in D2D, or a device for implementing the base station function in M2M. This is not specifically limited in embodiments of this application.

For example, the base station in embodiments of this application may include base stations in various forms, for example, a macro base station, a micro base station (which is also referred to as a small cell), a relay station, and an access point. This is not specifically limited in embodiments of this application.

In some embodiments, the network device 20 in this application may alternatively be a central unit (CU) or a distributed unit (DU). Alternatively, the network device may include a CU and a DU. A plurality of DUs may share one CU. One DU may alternatively be connected to a plurality of CUs. It may be understood that the network device is divided into the CU and the DU from a perspective of a logical function. The CU and the DU may be physically split, or may be deployed together. This is not specifically limited in embodiments of this application. The CU and the DU may be connected through an interface, for example, an F1 interface. The CU and the DU may be obtained through division based on a protocol layer of the wireless network. For example, functions of a radio resource control (RRC) protocol layer, a service data adaptation protocol (SDAP) protocol layer, and a packet data convergence protocol (PDCP) protocol layer are set in the CU, and functions of a radio link control (RLC) protocol layer, a media access control (MAC) protocol layer, a physical (PHY) protocol layer, and the like are set in the DU.

It may be understood that processing function division of the CU and the DU based on the protocol layers is merely an example, and there may be other division.

For example, the CU or the DU may have functions of more protocol layers through division. For example, the CU or the DU may alternatively have some processing functions of the protocol layers through division. In a design, some functions of the RLC layer and functions of the protocol layers above the RLC layer are set in the CU, and remaining functions of the RLC layer and functions of the protocol layers below the RLC layer are set in the DU. In another design, functions of the CU or the DU may alternatively be obtained through division based on a service type or another system requirement. For example, division is performed based on latency, a function whose processing time needs to satisfy a latency requirement is disposed on the DU, and a function whose processing time does not need to satisfy the latency requirement is disposed on the CU. In another design, the CU may alternatively have one or more functions of a core network. One or more CUs may be set in a centralized manner or a split manner. For example, the CUs may be disposed on a network side for ease of centralized management. The DU may have a plurality of radio frequency functions, or the radio frequency functions may be disposed remotely.

In some embodiments, the CU may include a CU control plane (CU-CP) and a CU user plane (CU-UP). It may be understood that the CU is divided into the CU-CP and the CU-UP from a perspective of a logical function. The CU-CP and the CU-UP may be obtained through division based on a protocol layer of the wireless network. For example, a function of an RRC protocol layer and a function that is of a PDCP protocol layer and that corresponds to a signaling radio bearer (SRB) are set in the CU-CP, and a function that is of the PDCP protocol layer and that corresponds to a data radio bearer (DRB) is set in the CU-UP. In addition, a function of an SDAP protocol layer may also be set in the CU-UP.

In some embodiments, the network device 20 and the terminal device 30 may also be referred to as communication apparatuses, and each may be a general-purpose device or a dedicated device. This is not specifically limited in embodiments of this application.

Figure 3:
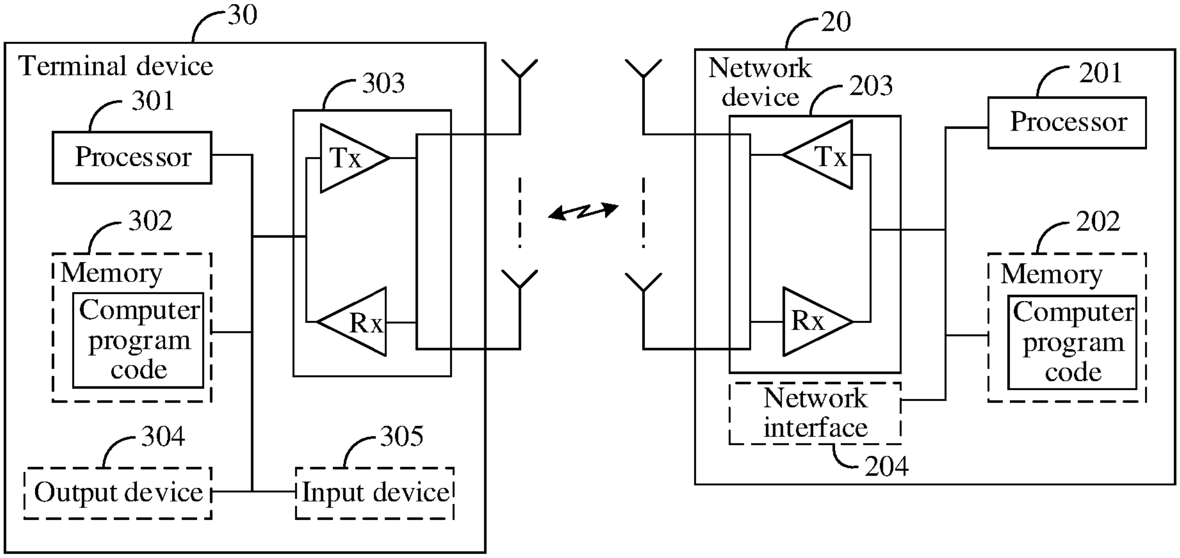
FIG. 3 is a schematic diagram of a structure of a terminal device and a structure of a network device according to this application.

FIG. 3 is a schematic diagram of a structure of a network device 20 and a structure of a terminal device 30 according to an embodiment of this application.

The terminal device 30 includes at least one processor (an example in which the terminal device 30 includes one processor 301 is used for description in FIG. 3) and at least one transceiver (an example in which the terminal device 30 includes one transceiver 303 is used for description in FIG. 3). Further, the terminal device 30 may further include at least one memory (an example in which the terminal device 30 includes one memory 302 is used for description in FIG. 3), at least one output device (an example in which the terminal device 30 includes one output device 304 is used for description in FIG. 3), and at least one input device (an example in which the terminal device 30 includes one input device 305 is used for description in FIG. 3).

The processor 301, the memory 302, and the transceiver 303 are connected through a communication line. The communication line may include a path for transmitting information between the foregoing components.

The processor 301 may be a general-purpose central processing unit (CPU), a microprocessor, an application-specific integrated circuit (ASIC), or one or more integrated circuits configured to control program execution of the solutions in this application. During specific implementation, in an embodiment, the processor 301 may alternatively include a plurality of CPUs, and the processor 301 may be a single-core (single-CPU) processor or a multi-core (multi-CPU) processor. The processor herein may be one or more devices, circuits, or processing cores configured to process data (for example, computer program instructions).

The memory 302 may be an apparatus having a storage function. For example, the memory 302 may be a read-only memory (ROM) or another type of static storage device capable of storing static information and instructions, may be a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of instructions or a data structure and capable of being accessed by a computer, but is not limited thereto. The memory 302 may exist independently, and is connected to the processor 301 through the communication line. The memory 302 may alternatively be integrated with the processor 301.

The memory 302 is configured to store computer-executable instructions for executing the solutions in this application, and the execution is controlled by the processor 301. Specifically, the processor 301 is configured to execute the computer-executable instructions stored in the memory 302, to implement the method in embodiments of this application.

Alternatively, in this application, the processor 301 may perform a processing-related function in a signal sending and receiving method provided in this application, and the transceiver 303 is responsible for communication with another device or a communication network. This is not specifically limited in this embodiment of this application.

The computer-executable instructions in this application may also be referred to as application program code or computer program code. This is not specifically limited in this embodiment of this application.

The transceiver 303 may be any apparatus such as a transceiver, and is configured to communicate with the another device or the communication network, for example, an ethernet, a radio access network (RAN), or a wireless local area network (WLAN). The transceiver 303 includes a transmitter (Tx) and a receiver (Rx).

The output device 304 communicates with the processor 301, and may display information in a plurality of manners. For example, the output device 304 may be a liquid crystal display (LCD), a light emitting diode (LED) display device, a cathode ray tube (CRT) display device, or a projector.

The input device 305 communicates with the processor 301, and may receive an input of a user in a plurality of manners. For example, the input device 305 may be a mouse, a keyboard, a touchscreen device, or a sensing device.

The network device 20 includes at least one processor (an example in which the network device 20 includes one processor 201 is used for description in FIG. 3) and at least one transceiver (an example in which the network device 20 includes one transceiver 203 is used for description in FIG. 3). Further, the network device 20 may further include at least one memory (an example in which the network device 20 includes one memory 202 is used for description in FIG. 3) and at least one network interface (an example in which the network device 20 includes one network interface 204 is used for description in FIG. 3). The processor 201, the memory 202, the transceiver 203, and the network interface 204 are connected through a communication line. The network interface 204 is configured to connect to a core network device through a link (for example, an S1 interface), or connect to a network interface of another network device through a wired or wireless link (for example, an X2 interface) (not shown in FIG. 3). This is not specifically limited in this embodiment of this application. In addition, for related descriptions of the processor 201, the memory 202, and the transceiver 203, refer to the descriptions of the processor 301, the memory 302, and the transceiver 303 in the terminal device 30. Details are not described herein again.

It may be understood that the structures shown in FIG. 3 constitute no specific limitation on the terminal device 30 and the network device 20. For example, in some other embodiments of this application, the terminal device 30 and the network device 20 may include more or fewer components than those shown in the figure, some components may be combined, some components may be split, or the components may be differently arranged. The components shown in the figure may be implemented by hardware, software, or a combination of the software and the hardware.

With reference to the accompanying drawings, the following describes in detail the method provided in embodiments of this application by using interaction between the network device 20 and the terminal device 30 shown in FIG. 3 as an example.

It may be understood that, in embodiments of this application, an execution body may perform a part or all of the steps in embodiments of this application. The steps or operations are merely examples. Embodiments of this application may further include performing other operations or variations of various operations. In addition, the steps may be performed in a sequence different from a sequence presented in embodiments of this application, and not all the operations in embodiments of this application may be performed.

It may be understood that, in embodiments of this application, a mechanism of the interaction between the network device and the terminal device may be appropriately transformed, to be applicable to interaction between a CU or a DU and the terminal device.

It should be noted that names of messages between devices, names of parameters or names of information in the messages, or the like in the following embodiments of this application are merely an example, and there may alternatively be other names during specific implementation. This is not specifically limited in embodiments of this application.

Figure 4:
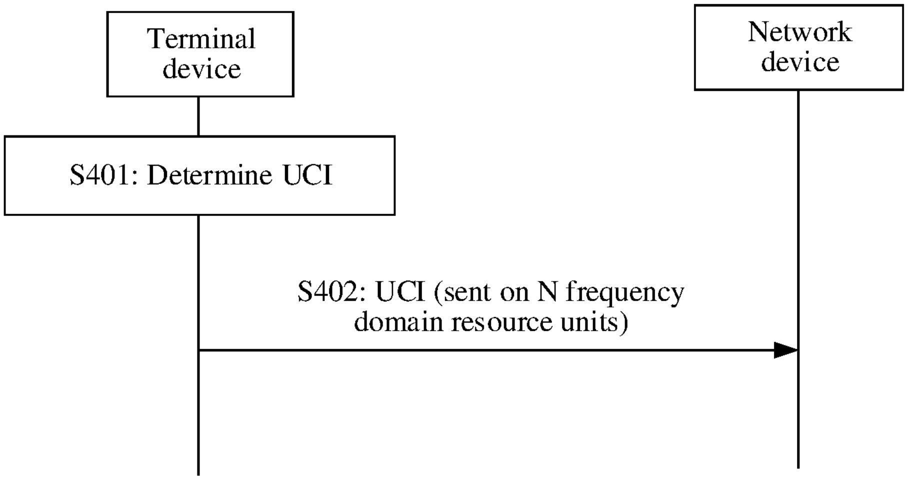
FIG. 4 is a schematic flowchart of an information transmission method according to this application.

FIG. 4 shows an information transmission method according to an embodiment of this application. The information transmission method includes the following steps.

S401: A terminal device determines UCI.

In some embodiments, the UCI may be for implementing one or more of the following functions: feeding back whether downlink data is successfully received, requesting to schedule a transmission resource, or feeding back a channel state. For example, the UCI may include one or more of HARQ-ACK information, an SR, and CSI.

In some embodiments, that a terminal device determines UCI may alternatively be understood as that the terminal device generates the UCI. Both may be replaced with each other. This is not specifically limited in this application.

In some embodiments, the UCI determined by the terminal device in step S401 is represented in a bit form. In other words, the UCI includes several bits. Therefore, the UCI may also be referred to as a UCI bit. In this application, descriptions are provided by using an example in which a quantity of the bits of the UCI determined by the terminal device in S401 is A, or in other words, a quantity of UCI bits is A, where A is a positive integer.

Figure 5:
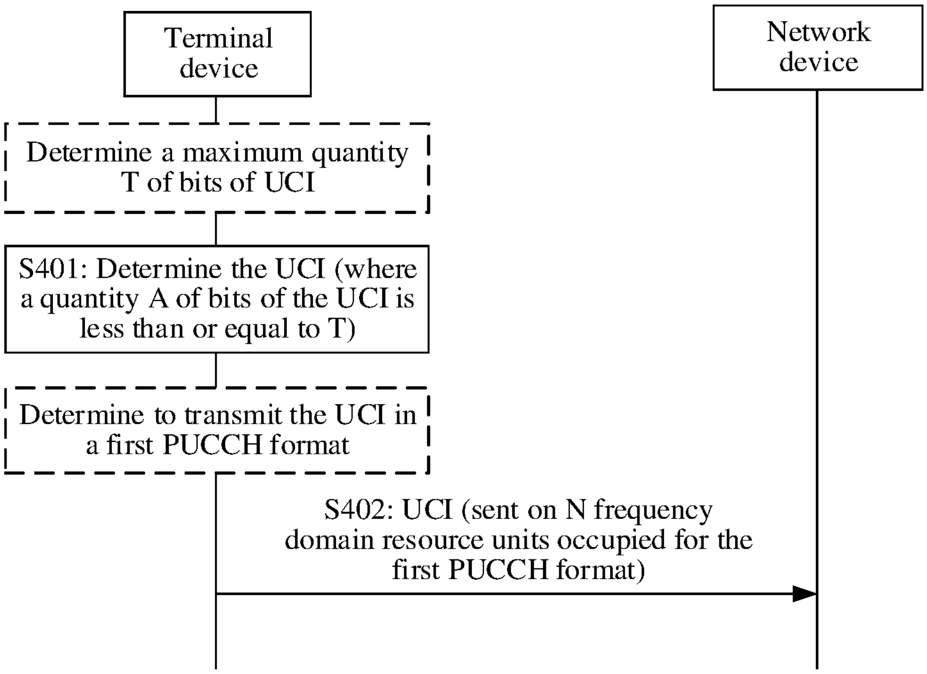
FIG. 5 is a schematic flowchart of another information transmission method according to this application.

In some embodiments, the quantity A of the bits of the UCI is less than or equal to a maximum quantity T of bits that are of the UCI and that can be transmitted on a PUCCH resource. In other words, a maximum threshold of a quantity of bits of the UCI that are transmitted on the PUCCH resource is T. Therefore, as shown in FIG. 5, before step S401, the information transmission method provided in this application may further include: The terminal device determines the maximum quantity T of bits of the UCI.

In an example, the maximum quantity T of bits of the UCI may be configured by a network device. For example, the network device may send first configuration information to the terminal device to configure the maximum quantity T of bits that are of the UCI and that can be transmitted on the PUCCH resource, and the first configuration information may be carried in an RRC message. In this case, that the terminal device determines the maximum quantity T of bits of the UCI may be that the terminal device receives the first configuration information of the network device, and determines the maximum quantity T of bits of the UCI based on the first configuration information.

In another example, the maximum quantity T of bits of the UCI may be agreed on in a protocol. In this case, the maximum quantity T of bits of the UCI may be stored in the terminal device when the terminal device is at delivery. That the terminal device determines the maximum quantity T of bits of the UCI may be understood as that the terminal device reads the maximum quantity T that is of bits of the UCI and that is stored in the terminal device.

S402: The terminal device sends the UCI to the network device on N frequency domain resource units. Accordingly, the network device receives the UCI from the terminal device.

About N Values:

In some embodiments, the value of the quantity N of the frequency domain resource units may be indicated by the network device. For example, the network device sends third indication information to the terminal device, where the third indication information indicates the value of N. Accordingly, after receiving the third indication information, the terminal device may determine N based on the third indication information.

It should be noted that the information transmission method provided in this application further relates to "first indication information" and "second indication information". The first indication information and the second indication information are described in subsequent embodiments. Details are not described herein.

In some other embodiments, the value of the quantity N of frequency domain resources may be a preset value. For example, the preset value may be predefined in a protocol.

In some embodiments, the value of N satisfies: $N=2^{\alpha_2}\cdot 3^{\alpha_3}\cdot 5^{\alpha_5}$, where $\alpha_2$, $\alpha_3$, and $\alpha_5$ are nonnegative positive numbers.

In some embodiments, the frequency domain resource unit in this application is a unit of a frequency domain resource, and includes one or more frequency domain resources with a minimum granularity. For example, a frequency domain resource with a minimum granularity in an orthogonal frequency division multiplexing (OFDM) system is a subcarrier. Therefore, the frequency domain resource unit in this application may include one or more subcarriers. For example, the frequency domain resource unit in this application may be an RB. For example, the RB includes 12 subcarriers. With evolution of a communication system, a quantity of subcarriers included in one RB in this application may alternatively be another value.

In some embodiments, the N frequency domain resource units may be N consecutive frequency domain resource units in frequency domain, for example, N consecutive RBs, or in other words, N consecutive physical resource blocks (PRBs).

In some embodiments, the N frequency domain resource units may alternatively be non-consecutive in frequency domain. For example, a difference between indexes of any two adjacent frequency domain resource units in the N frequency domain resource units is a first value. Alternatively, in the N frequency domain resource units, N1 frequency domain resource units are consecutive in frequency domain, and N2 remaining frequency domain resource units are non-consecutive in frequency domain, where N is a sum of N1 and N2. This is not specifically limited in this application.

In some embodiments, the terminal device sends the UCI to the network device in a first PUCCH format. The first PUCCH format may be determined by the terminal device before step S402. Therefore, as shown in FIG. 5, before step S402, the information transmission method provided in this application further includes: The terminal device determines to transmit the UCI in the first PUCCH format. In an example, the first PUCCH format is a PUCCH format 4.

In an example, the network device may send second configuration information to the terminal device, where the second configuration information is for configuring the first PUCCH format, for example, configuring a time domain resource position, a frequency domain resource position, and a modulation scheme that correspond to the first PUCCH format. In this case, that the terminal device determines to transmit the UCI in the first PUCCH format may include: The terminal device receives the second configuration information from the network device, and determines, based on the second configuration information, to transmit the UCI in the first PUCCH format.

In some embodiments, the N frequency domain resource units are frequency domain resource units occupied for the first PUCCH format.

Based on this solution, in this application, the UCI is sent by using the N frequency domain resource units. When a power spectral density is determined, a larger quantity of frequency domain resource units may indicate a higher transmit power. Because the frequency domain resource units for sending the UCI are increased in this application, the transmit power of the terminal device can be increased, so that coverage of the UCI is improved. In addition, because the frequency domain resource units for sending the UCI are increased in this application, when a quantity of bits of the UCI that are carried on each frequency domain resource unit has a threshold, more bits of the UCI can be carried on the N frequency domain resource units. When a data volume of the CSI is large, feedback efficiency of the CSI can be improved, so that communication efficiency is improved. In addition, when the quantity of bits of the UCI is small, rate matching may be performed on the N frequency domain resource units, to reduce a code rate, so that transmission reliability is improved.

The following describes a specific method for sending the UCI on the N frequency domain resource units. For example, the following five manners may be included.

Manner 1:

The terminal device segments the UCI, and then sends the UCI.

In some embodiments, the terminal device may divide the UCI into N UCI subsegments. In other words, the UCI includes the N UCI subsegments. Different UCI subsegments in the N UCI subsegments are carried by different frequency domain resource units in the N frequency domain resource units. In other words, each of the N UCI subsegments corresponds to one frequency domain resource unit, and the different UCI subsegments correspond to the different frequency domain resource units.

In some embodiments, the UCI subsegment in this application may also be referred to as UCI sub-information. Both may be replaced with each other. This is not specifically limited in this application.

In some embodiments, at least two of the N UCI subsegments may have different quantities of bits. Alternatively, when N may be exactly divided by the quantity A of the bits of the UCI, each UCI subsegment may have a same quantity of bits, namely, A/N bits.

In some embodiments, when N cannot be exactly divided by the quantity A of the bits of the UCI, a quantity of bits of each of N−1 of the N UCI subsegments may be $$\left\lceil \frac{A}{N} \right\rceil,$$

and a quantity of bits of a remaining UCI subsegment may be $$A-(N-1)\cdot\left\lceil \frac{A}{N} \right\rceil.$$

$\lfloor\ \rfloor$ represents rounding up. Certainly, rounding up in the formula may alternatively be replaced with rounding down or rounding off to an integer. This is not specifically limited in this application.

In an example, the N−1 UCI subsegments each having $$\left\lceil \frac{A}{N} \right\rceil$$

bits may be the first N−1 UCI subsegments, the last N−1 UCI subsegments, or any N−1 UCI subsegments in the N UCI subsegments. This is not specifically limited in this application.

In an implementation, a sum of a quantity of bits of a UCI subsegment and a quantity of bits of a CRC corresponding to the UCI subsegment is less than or equal to a first threshold Q, and the first threshold Q is a maximum quantity of bits that can be carried by one frequency domain resource unit.

For example, the first threshold may be configured by the network device, or may be specified in a protocol. This is not specifically limited in this application.

Figure 6A:
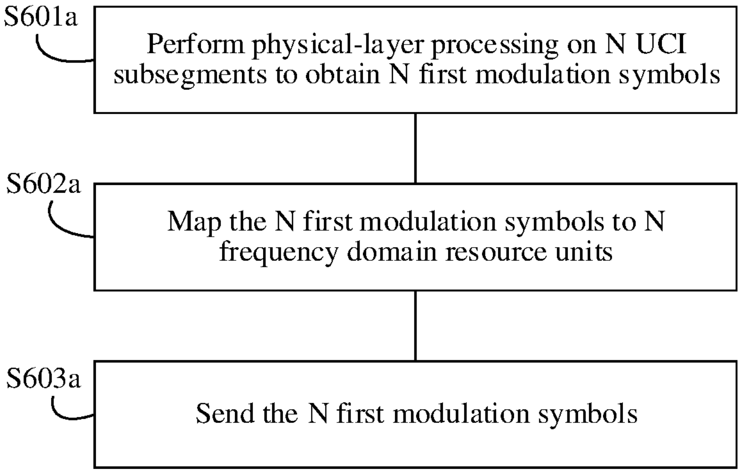
FIG. 6*a* is a schematic flowchart of sending UCI by a terminal device according to this application.

In some embodiments, as shown in FIG. 6*a*, that the terminal device sends the UCI on N frequency domain resource units may include the following steps.

S601*a*: Perform physical-layer processing on the N UCI subsegments to obtain N first modulation symbols.

In an implementation, the terminal device separately performs physical-layer processing on the N UCI subsegments to obtain the N first modulation symbols, where the first modulation symbol may alternatively be understood as a modulation symbol corresponding to the UCI subsegment. In other words, the terminal device performs physical-layer processing on an $i^{th}$ UCI sub-segment to obtain one first modulation symbol, where i=1, 2, . . . , N.

In some embodiments, the physical-layer processing includes rate matching, and the rate matching is based on one frequency domain resource unit. In other words, rate matching is performed by using the frequency domain resource unit. In other words, the rate matching is for matching a carrying capability of the frequency domain resource unit.

For example, a length of an input bit to the rate matching is M. After a length E of an output bit sequence after the rate matching is determined, rate matching may be performed. E=f ($E_{tot}$). In other words, E is a function that is based on $E_{tot}$. In other words, a value of E is related to $E_{tot}$. In other words, the value of E is determined based on $E_{tot}$.

In an example, when the terminal device performs rate matching based on the frequency domain resource unit, if a modulation scheme is QPSK:

$$E_{tot} = \frac{a \cdot N_{symb,UCI}^{PUCCH}}{N_{SF}^{PUCCH}}.$$

If a modulation mode is π/2 BPSK:

$$N_{SF}^{PUCCH}$$

is a spreading factor corresponding to the first PUCCH format.

$$N_{symb,UCI}^{PUCCH}$$

is a time unit quantity corresponding to the first PUCCH format. a and b are positive numbers. For example, a is equal to 14, and b is equal to 12.

The spreading factor corresponding to the first PUCCH format is for frequency domain spreading, and can resist frequency-selective fading. For example, a value of the spreading factor may be 2 or 4.

For example, a time unit in this application may be a symbol, a slot, a subframe, or a frame.

Figure 7:
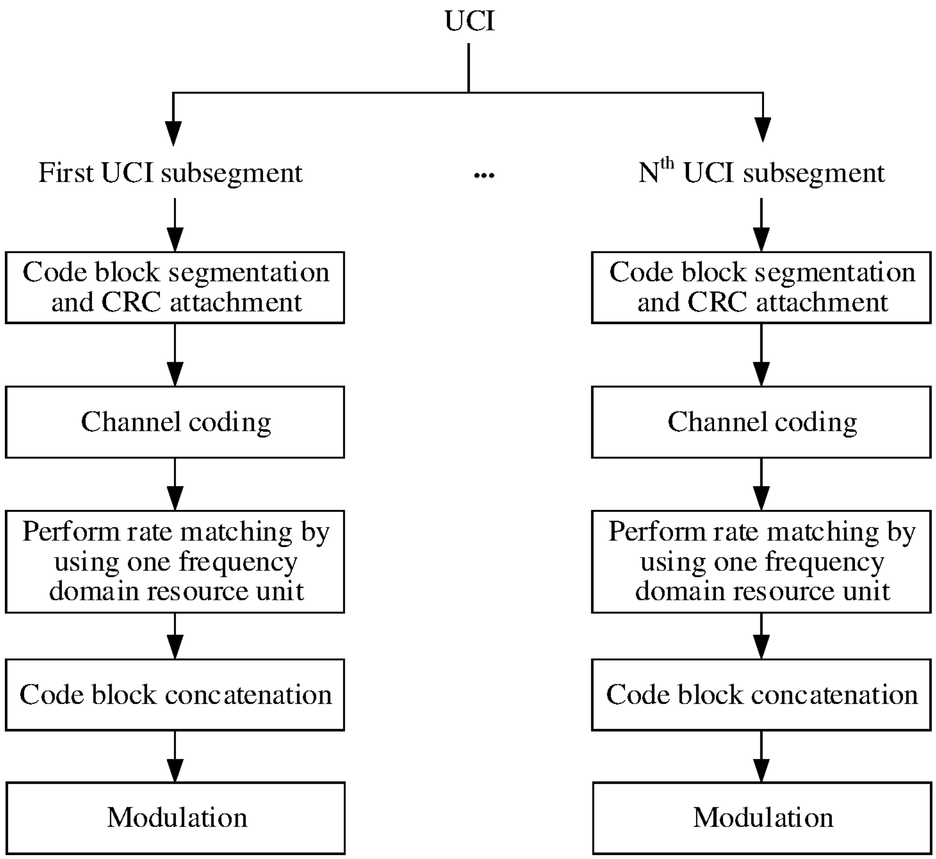
FIG. 7 is a schematic diagram of a physical-layer processing procedure performed by a terminal device on UCI according to this application.

In some other embodiments, in addition to rate matching, the physical-layer processing may further include one or more of the following: code block segmentation and CRC attachment, channel coding, code block concatenation, or modulation. For example, when the physical-layer processing includes all of the foregoing listed operations, FIG. 7 shows an execution procedure of all the operations. To be specific, after code block segmentation and CRC attachment are performed on a UCI subsegment, channel coding is performed, then rate matching is performed on a channel coding result, then code block concatenation is performed on a rate matching result, and modulation is performed finally.

S602*a*: Map the N first modulation symbols to the N frequency domain resource units.

In some embodiments, the mapping the N first modulation symbols to the N frequency domain resource units may include: mapping one first modulation symbol to one frequency domain resource unit, where first modulation symbols mapped to the different frequency domain resource units are different. For example, the terminal device may map a first modulation symbol corresponding to an $i^{th}$ piece of UCI to an $i^{th}$ frequency domain resource unit, where i=1, 2, . . . , N.

S603*a*: Send the N first modulation symbols.

In some embodiments, the N first modulation symbols may be included in a first signal. The terminal device may send the first signal to the network device. The first signal is carried by the N frequency domain resource units. In other words, the first signal is sent to the network device on the N frequency domain resource units.

Figure 6B:
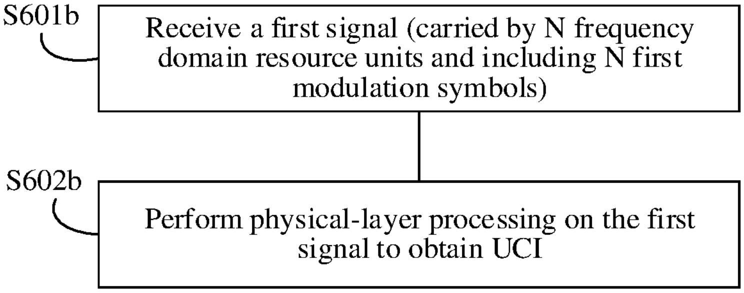
FIG. 6*b* is a schematic flowchart of receiving UCI by a network device according to this application.

When the terminal device sends the UCI in Manner 1, as shown in FIG. 6*b*, a receiving operation of the network device may include the following steps.

S601*b*: Receive the first signal from the terminal device.

In some embodiments, the first signal is carried by the N frequency domain resource units, and the first signal includes the N first modulation symbols.

S602*b*: Perform physical-layer processing on the first signal to obtain the UCI.

The UCI includes the N UCI subsegments. For the UCI subsegments, refer to the foregoing related descriptions. Details are not described herein again.

In some embodiments, the physical-layer processing performed by the network device on the first signal matches the physical-layer processing performed by the terminal device on the UCI subsegments. For example, if the physical-layer processing performed by the terminal device on the UCI subsegments includes the rate matching, the physical-layer processing performed by the network device on the first signal includes rate de-matching; if the physical-layer processing performed by the terminal device on the UCI subsegments includes the modulation, the physical-layer processing performed by the network device on the first signal includes demodulation; if the physical-layer processing performed by the terminal device on the UCI subsegments includes the code block concatenation, the physical-layer processing performed by the network device on the first signal includes code block de-concatenation; if the physical-layer processing performed by the terminal device on the UCI subsegments includes the channel coding, the physical-layer processing performed by the network device on the first signal includes channel decoding; or if the physical-layer processing performed by the terminal device on the UCI subsegments includes the code block segmentation and the CRC attachment, the physical-layer processing performed by the network device on the first signal includes code block de-segmentation and CRC de-attachment.

In an example, after obtaining the UCI, the network device may perform related processing based on the UCI. For example, when the UCI includes the HARQ-ACK information, the network device determines, based on the HARQ-ACK information, whether to retransmit the downlink data; when the UCI includes the SR, the network device schedules an uplink resource for the terminal device; or when the UCI includes the CSI, the network device precodes the downlink data based on the CSI. This is not specifically limited in this application.

Based on this solution, the UCI is divided into the N UCI subsegments to be transmitted on the N frequency domain resource units, to decrease a quantity of bits of the UCI that are transmitted on each frequency domain resource unit, so that a redundant bit can be added, that is, a code rate can be reduced, and transmission reliability can be improved. In addition, compared with one frequency domain resource unit, the N frequency domain resource units can be for transmitting more UCI. When the UCI includes the CSI, and the data volume of the CSI is large, all data of the CSI may be fed back to the network device through one time of sending, to improve feedback timeliness of the CSI, so that communication efficiency is improved. In addition, the UCI is divided into the N UCI subsegments. When a part of the N UCI subsegments are successfully transmitted, the network device may obtain a part of the UCI, and the terminal device may retransmit a part that fails to be transmitted, and does not need to retransmit all of the UCI, so that resource overheads can be reduced.

Manner 2:

After performing physical-layer processing on the UCI, the terminal device sends the UCI in a duplication manner. For example, the UCI is sent through duplication of a modulation symbol.

Figure 8A:
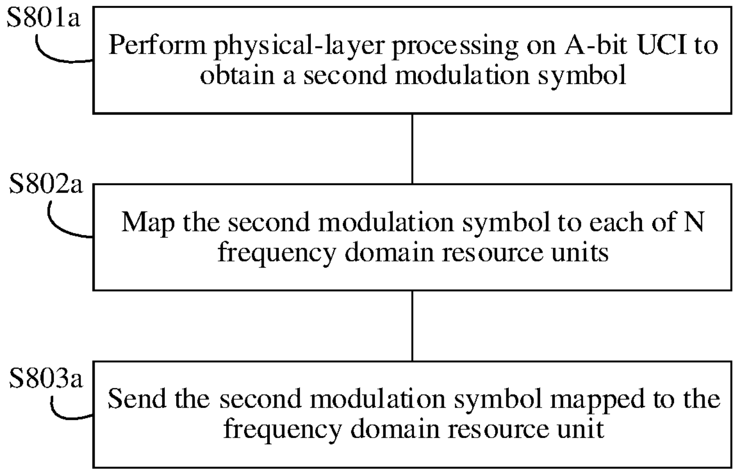
FIG. 8*a* is a schematic flowchart of sending UCI by a terminal device according to this application.

For example, the quantity of the bits of the UCI is A. As shown in FIG. 8*a*, in Manner 2, that the terminal device sends the UCI on N frequency domain resource units may include the following steps.

S801*a*: Perform physical-layer processing on the A-bit UCI to obtain a second modulation symbol.

The second modulation symbol may alternatively be understood as a modulation symbol corresponding to a A-bit UCI.

In some embodiments, a sum of the quantity A of the bits of the UCI and a quantity of bits of a CRC corresponding to the UCI is less than or equal to a first threshold. For the first threshold, refer to the related descriptions in Manner 1. Details are not described herein again.

In some embodiments, the physical-layer processing includes rate matching, and the rate matching is based on one frequency domain resource unit. Refer to the related descriptions in step S601*a*. Details are not described herein again.

Figure 9:
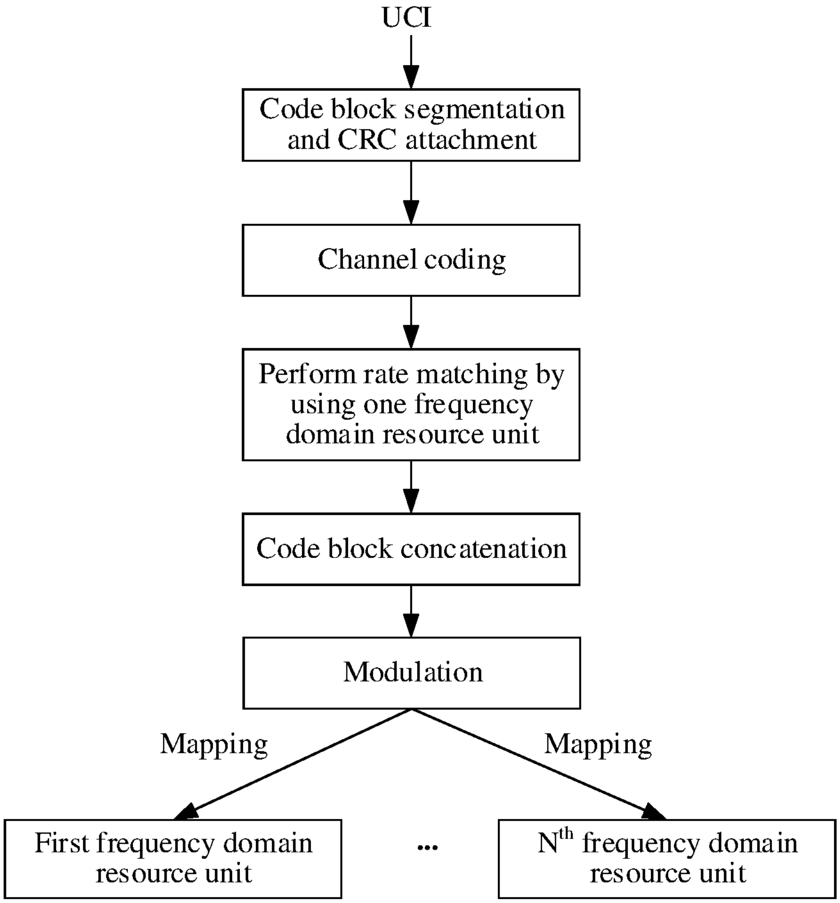
FIG. 9 is a schematic diagram of a physical-layer processing procedure performed by a terminal device on UCI according to this application.

In some other embodiments, in addition to rate matching, the physical-layer processing may further include one or more of the following: code block segmentation and CRC attachment, channel coding, code block concatenation, or modulation. When the physical-layer processing includes all of the foregoing listed operations, FIG. 9 shows an execution procedure of all the operations. To be specific, after code block segmentation and CRC attachment are performed on the A-bit UCI, channel coding is performed, then rate matching is performed on a channel coding result, then code block concatenation is performed on a rate matching result, and modulation is performed finally.

S802*a*: Separately map the second modulation symbol to each of the N frequency domain resource units.

In other words, modulation symbols mapped to all frequency domain resource units are the same, and are all second modulation symbols. For example, as shown in FIG. 9, after the modulation is completed, the terminal device separately maps the second modulation symbol to each frequency domain resource unit.

S803*a*: Send the second modulation symbol mapped to the frequency domain resource unit.

In some embodiments, the second modulation symbol mapped to the frequency domain resource unit, namely, N same second modulation symbols, may be included in a second signal. The terminal device may send the second signal to the network device. The second signal is carried by the N frequency domain resource units. In other words, the second signal is sent to the network device on the N frequency domain resource units.

In some embodiments, Manner 2 may alternatively be understood as that the A-bit UCI is mapped to the N frequency domain resource units N times. In other words, the A-bit UCI is repeated on the N frequency domain resource units N−1 times. In other words, the A-bit UCI is sent on the N frequency domain resource units N times. In other words, N pieces of UCI are sent on the N frequency domain resource units.

Figure 8B:
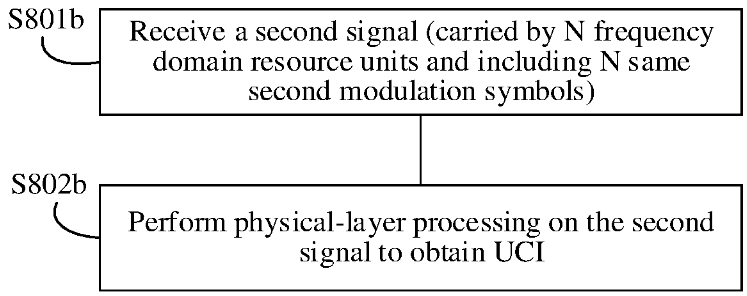
FIG. 8*b* is a schematic flowchart of receiving UCI by a network device according to this application.

When the terminal device sends the UCI in Manner 2, as shown in FIG. 8*b*, a receiving operation of the network device may include the following steps.

S801*b*: Receive the second signal from the terminal device.

In some embodiments, the second signal is carried by the N frequency domain resource units, and the second signal includes the N same second modulation symbols.

S802*b*: Perform physical-layer processing on the second signal to obtain the UCI.

In an implementation, the physical-layer processing performed by the network device on the second signal matches the physical-layer processing performed by the terminal device on the A-bit UCI. Refer to the related descriptions in step S602*b*. Details are not described herein again.

In an implementation, because the second signal includes the N same second modulation symbols, the network device may perform physical-layer processing on a part of the second modulation symbols in the second signal. In other words, the network device may perform physical-layer processing on the second modulation symbol carried by a part of the frequency domain resource units, for example, perform physical-layer processing on the second modulation symbol carried by only one frequency domain resource unit.

In an example, after obtaining the UCI, the network device may perform related processing based on the UCI. Refer to the related descriptions in step S602b. Details are not described herein again.

Based on this solution, the UCI is mapped to the frequency domain resource units N times through duplication of the modulation symbol in frequency domain. In a frequency selective channel, receiving reliability can be improved, so that communication efficiency is improved.

Manner 3:

The terminal device sends N pieces of UCI on the N frequency domain resource units through duplication of the UCI.

Figure 10A:
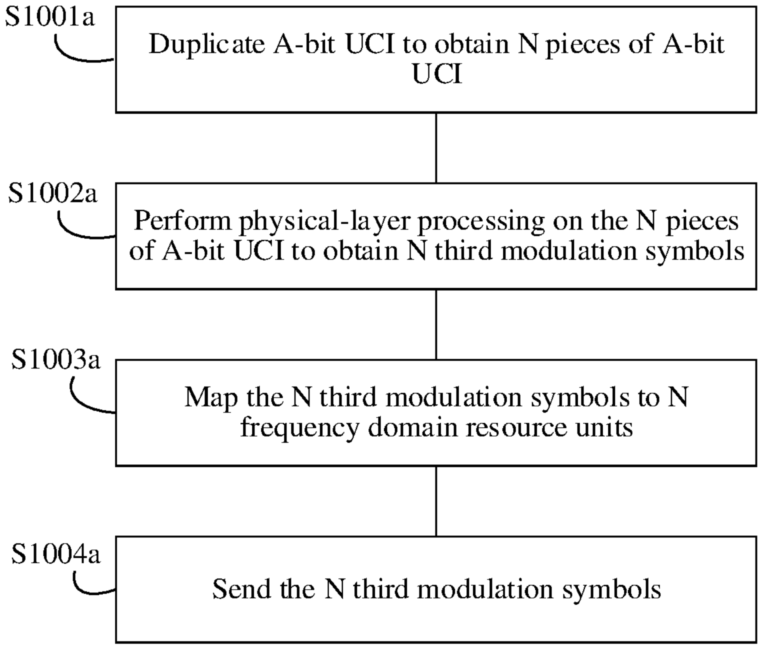
FIG. 10*a* is a schematic flowchart of sending UCI by a terminal device according to this application.

In an example, the quantity of the bits of the UCI is A. As shown in FIG. 10a, in Manner 3, that the terminal device sends the UCI on N frequency domain resource units may include the following steps.

S1001a: Duplicate the A-bit UCI to obtain the N pieces of A-bit UCI.

In other words, a total quantity of bits of the UCI sent by the terminal device on the N frequency domain resource units is A times N.

In some embodiments, a sum of the quantity A of the bits of the UCI and a quantity of bits of a CRC corresponding to the UCI is less than or equal to a first threshold. For the first threshold, refer to the related descriptions in Manner 1. Details are not described herein again.

S1002a: Perform physical-layer processing on the N pieces of A-bit UCI to obtain N third modulation symbols.

In an implementation, the terminal device separately performs physical-layer processing on the N pieces of A-bit UCI to obtain the N third modulation symbols, where the third modulation symbols may alternatively be understood as a modulation symbol corresponding to the A-bit UCI. In other words, the terminal device performs physical-layer processing on an $i^{th}$ piece of UCI to obtain one third modulation symbol, where i=1, 2, . . . , N. It may be understood that the N third modulation symbols are same modulation symbols.

In some embodiments, the physical-layer processing includes rate matching, and the rate matching is based on one frequency domain resource unit. Refer to the related descriptions in step S601a. Details are not described herein again.

Figure 11:
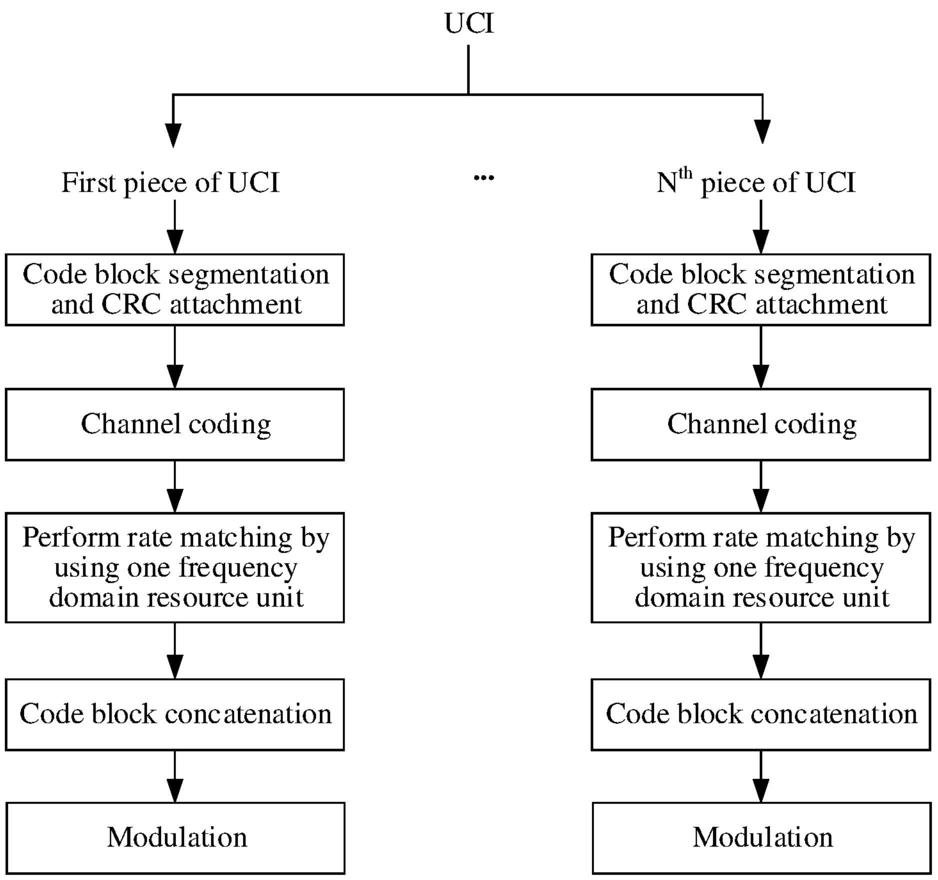
FIG. 11 shows a physical-layer processing procedure performed by a terminal device on UCI according to this application.

In some other embodiments, in addition to rate matching, the physical-layer processing may further include one or more of the following: code block segmentation and CRC attachment, channel coding, code block concatenation, or modulation. Refer to the related descriptions in step S601a. Details are not described herein again. For example, when the physical-layer processing includes all of the foregoing listed operations, FIG. 11 shows an execution procedure of all the operations. To be specific, after code block segmentation and CRC attachment are performed on the A-bit UCI, channel coding is performed, then rate matching is performed on a channel coding result, then code block concatenation is performed on a rate matching result, and modulation is performed finally.

S1003a: Map the N third modulation symbols to the N frequency domain resource units.

In other words, same third modulation symbols are mapped to all frequency domain resource units.

S1004a: Send the N third modulation symbols.

In an implementation, the N same third modulation symbols may be included in a third signal. The terminal device may send the third signal to the network device. The third signal may be carried by the N frequency domain resource units. In other words, the third signal is sent to the network device on the N frequency domain resource units.

In some embodiments, Manner 3 may alternatively be understood as that the A-bit UCI is repeated on the N frequency domain resource units N−1 times. In other words, the A-bit UCI is mapped to the N frequency domain resource units N times. In other words, the A-bit UCI is sent on the N frequency domain resource units N times. In other words, the N pieces of UCI are sent on the N frequency domain resource units.

Figure 10B:
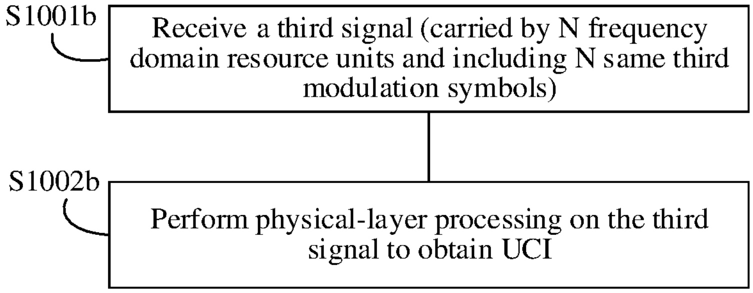
FIG. 10*b* is a schematic flowchart of receiving UCI by a network device according to this application.

When the terminal device sends the UCI in Manner 3, as shown in FIG. 10b, a receiving operation of the network device may include the following steps.

S1001b: Receive the third signal from the terminal device.

In some embodiments, the third signal is carried by the N frequency domain resource units, and the third signal includes the N same third modulation symbols.

S1002b: Perform physical-layer processing on the third signal to obtain the UCI.

In an implementation, the physical-layer processing performed by the network device on the third signal matches the physical-layer processing performed by the terminal device on the A-bit UCI. Refer to the related descriptions in step S602b. Details are not described herein again.

In some embodiments, because the third signal includes the N same third modulation symbols, the network device may perform physical-layer processing on a part of the third modulation symbols in the third signal. In other words, the network device may perform physical-layer processing on the third modulation symbol carried by a part of the frequency domain resource units, for example, perform physical-layer processing on the third modulation symbol carried by only one frequency domain resource unit.

In an example, after obtaining the UCI, the network device may perform related processing based on the UCI. Refer to the related descriptions in step S602b. Details are not described herein again.

Based on this solution, the UCI is mapped to the frequency domain resource units N times, or in other words, is repeated N−1 times, through duplication of the UCI. In a frequency selective channel, receiving reliability can be improved, so that communication efficiency is improved.

Manner 4:

The terminal device sends X pieces of UCI on the N frequency domain resource units through duplication of the UCI, where X is a positive integer greater than 1.

Figure 12A:
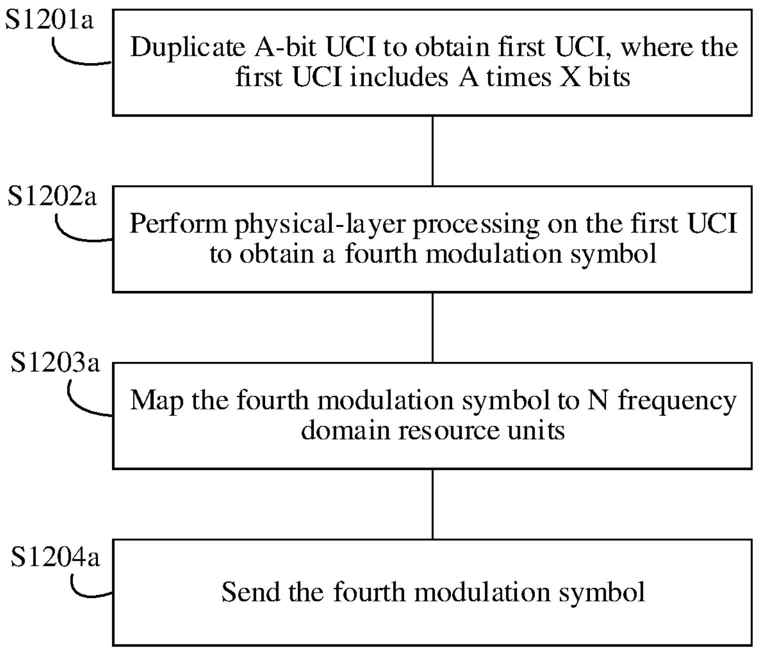
FIG. 12*a* is a schematic flowchart of sending UCI by a terminal device according to this application.

In some embodiments, the quantity of the bits of the UCI is A. As shown in FIG. 12a, in Manner 4, that the terminal device sends the UCI on N frequency domain resource units may include the following steps.

S1201a: Duplicate the A-bit UCI to obtain first UCI, where the first UCI includes A times X bits.

In other words, a total quantity of bits of the UCI sent by the terminal device on the N frequency domain resource units is A times X.

S1202a: Perform physical-layer processing on the first UCI to obtain a fourth modulation symbol.

The fourth modulation symbol may be understood as a modulation symbol corresponding to the first UCI.

In some embodiments, the physical-layer processing includes rate matching, and the rate matching is based on the N frequency domain resource units. In other words, rate matching is performed by using the N frequency domain resource units. In other words, the rate matching is for matching a carrying capability of the N frequency domain resource units.

For example, a length of an input bit to the rate matching is M. After a length E of an output bit sequence after the rate matching is determined, rate matching may be performed. E=f ($E_{tot}$). In other words, E is a function that is based on $E_{tot}$. In other words, a value of E is related to $E_{tot}$. In other words, the value of E is determined based on $E_{tot}$.

In an example, when the terminal device performs rate matching based on the N frequency domain resource units, if a modulation scheme is QPSK:

$$E_{tot} = \frac{a \cdot N \cdot N_{symb,UCI}^{PUCCH}}{N_{SF}^{PUCCH}}.$$

If a modulation mode is π/2 BPSK:

$$E_{tot} = \frac{b \cdot N \cdot N_{symb,UCI}^{PUCCH}}{N_{SF}^{PUCCH}}.$$

For each parameter, refer to the related descriptions in step S601*a*. Details are not described herein again. It may be understood that, in step S1202*a*, the length M of the input bit to the rate matching is a quantity of bits obtained through channel coding performed on A-times-X-bit UCI (namely, the first UCI).

About a Value of X:

In some embodiments, a sum of the quantity (namely, A times X) of bits of the first UCI and a quantity of bits of a CRC corresponding to the first UCI is less than or equal to a second threshold; or a sum of the quantity of bits of the first UCI and a quantity of bits of a CRC corresponding to the first UCI is less than or equal to a smaller value in a second threshold and a third threshold.

In an example, the second threshold may be determined based on one or more of the following: N, a quantity of the subcarriers included in the frequency domain resource unit, a spreading factor corresponding to the first PUCCH format, a time unit quantity corresponding to the first PUCCH format, the modulation scheme corresponding to the first PUCCH format, or a first code rate, the first PUCCH format is a PUCCH format used for sending the UCI, and the first code rate is a code rate configured by the network device.

For example, the second threshold, N, the quantity of the subcarriers included in the frequency domain resource unit, the spreading factor corresponding to the first PUCCH format, the time unit quantity corresponding to the first PUCCH format, the modulation scheme corresponding to the first PUCCH format, and the first code rate satisfy the following formula:

$$Thr_2 = N \cdot N_{sc,ctrl} \cdot N_{symb,UCI}^{PUCCH} \cdot Q_m \cdot r.$$

In other words, $$A \cdot X + O_{CRC} \leq N \cdot N_{sc,ctrl} \cdot N_{symb,UCI}^{PUCCH} \cdot Q_m \cdot r.$$

$Thr_2$ is the second threshold, and $O_{CRC}$ is the quantity of bits of the CRC corresponding to the first UCI.

$$N_{sc,ctrl} = N_{sc}/N_{SF}^{PUCCH}, N_{sc}$$

is the quantity of the subcarriers included in the frequency domain resource unit, and $$N_{SF}^{PUCCH}$$

is the spreading factor corresponding to the first PUCCH format.

$$N_{symb,UCI}^{PUCCH}$$

is the time unit quantity corresponding to the first PUCCH format.

$Q_m$ is related to the modulation scheme corresponding to the first PUCCH format. For example, when the modulation scheme is QPSK, a value of $Q_m$ is 2. When the modulation scheme is π/2 BPSK, a value of $Q_m$ is 1.

r is the first code rate, and for example, may be a code rate configured by the network device by using an RRC message.

In an example, the third threshold may be a maximum quantity of bits that can be carried by the N frequency domain resource units in total. The third threshold may be configured by the network device, or may be agreed on in a protocol. This is not specifically limited in this application.

In some other embodiments, the value of X may be indicated by the network device. For example, the information transmission method provided in this application may further include: The network device sends the first indication information to the terminal device, where the first indication information indicates the value of X. Accordingly, after receiving the first indication information from the network device, the terminal device may determine the specific value of X based on the first indication information.

Figure 13:
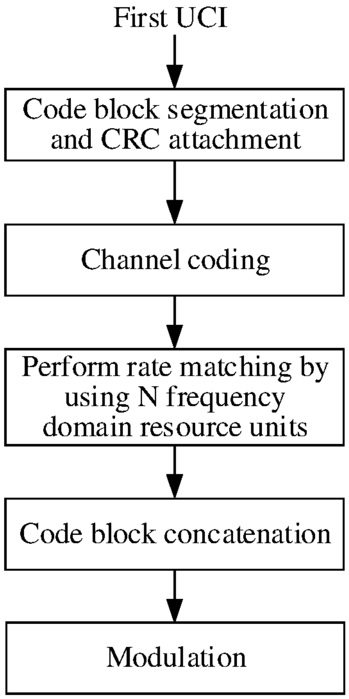
FIG. 13 shows a physical-layer processing procedure performed by a terminal device on UCI according to this application.

In some embodiments, in addition to rate matching, the physical-layer processing may further include one or more of the following: code block segmentation and CRC attachment, channel coding, code block concatenation, or modulation. Refer to the related descriptions in step S601*a*. Details are not described herein again. For example, when the physical-layer processing includes all of the foregoing listed operations, FIG. 13 shows an execution procedure of all the operations. To be specific, after code block segmentation and CRC attachment are performed on the A-times-X-bit first UCI, channel coding is performed, then rate matching is performed on a channel coding result by using the N frequency domain resource units, then code block concatenation is performed on a rate matching result, and modulation is performed finally.

S1203*a*: Map the fourth modulation symbol to the N frequency domain resource units.

In some embodiments, a part of the fourth modulation symbol is mapped to each of the N frequency domain resource units.

S1204*a*: Send the fourth modulation symbol.

In an implementation, the fourth modulation symbol may be included in a fourth signal. The terminal device may send the fourth signal to the network device. The fourth signal may be carried by the N frequency domain resource units. In other words, the fourth signal is sent to the network device on the N frequency domain resource units.

In some embodiments, Manner 4 may alternatively be understood as that the A-bit UCI is repeated on the N frequency domain resource units X−1 times. In other words, the A-bit UCI is mapped to the N frequency domain resource units X times. In other words, the A-bit UCI is sent on the N frequency domain resource units X times. In other words, the X pieces of UCI are sent on the N frequency domain resource units.

Figure 12B:
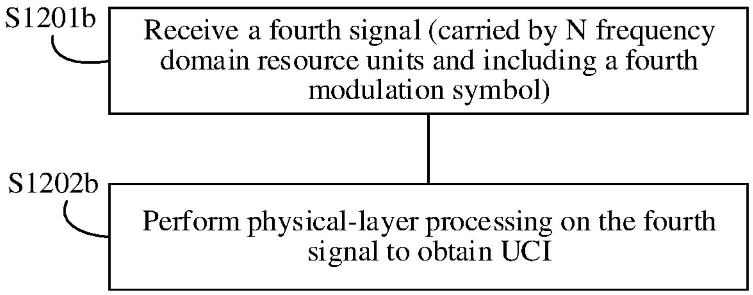
FIG. 12*b* is a schematic flowchart of receiving UCI by a network device according to this application.

When the terminal device sends the UCI in Manner 4, as shown in FIG. 12*b*, a receiving operation of the network device may include the following steps.

S1201*b*: Receive the fourth signal from the terminal device.

In an implementation, the fourth signal is carried by the N frequency domain resource units, and the fourth signal includes the fourth modulation symbol.

S1202*b*: Perform physical-layer processing on the fourth signal to obtain the UCI.

In an implementation, the physical-layer processing performed by the network device on the fourth signal matches the physical-layer processing performed by the terminal device on the first UCI. Refer to the related descriptions in step S602*b*. Details are not described herein again.

In an example, after obtaining the UCI, the network device may perform related processing based on the UCI. Refer to the related descriptions in step S602*b*. Details are not described herein again.

Based on this solution, the UCI is mapped to the frequency domain resource units X times, or in other words, is repeated X−1 times, through duplication of the UCI. In a frequency selective channel, transmission reliability can be improved, so that communication efficiency is improved. In addition, the value of X may be configured by the network device, or may be determined by the terminal device based on a related configuration of the network device, to improve transmission flexibility of the UCI.

Manner 5:

The terminal device performs rate matching based on the N frequency domain resource units, and sends one piece of UCI on the N frequency domain resource units.

Figure 14A:
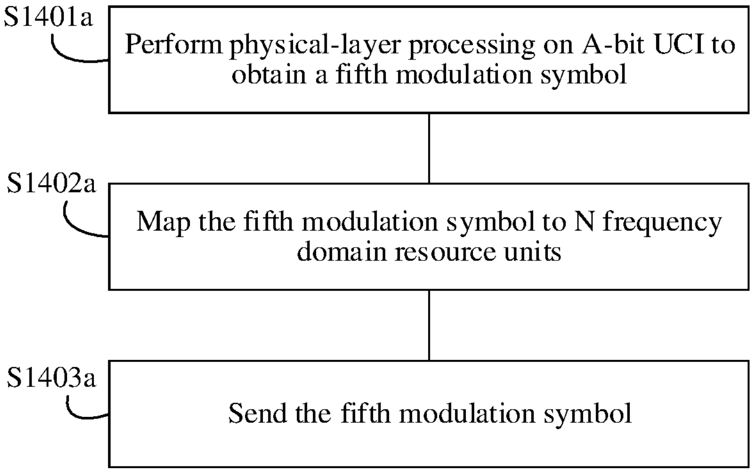
FIG. 14*a* is a schematic flowchart of sending UCI by a terminal device according to this application.

In an example, the quantity of the bits of the UCI is A. As shown in FIG. 14*a*, in Manner 5, that the terminal device sends the UCI on N frequency domain resource units may include the following steps.

S1401*a*: Perform physical-layer processing on the A-bit UCI to obtain a fifth modulation symbol.

The fifth modulation symbol may be understood as a modulation symbol corresponding to the A-bit UCI.

In some embodiments, the physical-layer processing includes rate matching, and the rate matching is based on the N frequency domain resource units. Refer to the related descriptions in step S1201*a*. Details are not described herein again.

Figure 15:
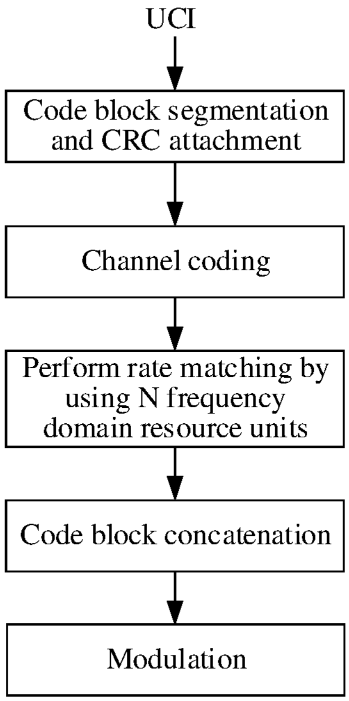
FIG. 15 shows a physical-layer processing procedure performed by a terminal device on UCI according to this application.

In some other embodiments, in addition to rate matching, the physical-layer processing may further include one or more of the following: code block segmentation and CRC attachment, channel coding, code block concatenation, or modulation. Refer to the related descriptions in step S601*a*. Details are not described herein again. For example, when the physical-layer processing includes all of the foregoing listed operations, FIG. 15 shows an execution procedure of all the operations. To be specific, after code block segmentation and CRC attachment are performed on the A-bit UCI, channel coding is performed, then rate matching is performed on a channel coding result by using the N frequency domain resource units, then code block concatenation is performed on a rate matching result, and modulation is performed finally.

In some embodiments, the network device may send second indication information to the terminal device, where the second indication information indicates that a quantity of frequency domain resource units for carrying the UCI is not less than N. In other words, the network device indicates that the terminal device is not allowed to reduce frequency domain resource usage. That is, the terminal device sends the UCI on all frequency domain resources that are configured by the network device or agreed on in a protocol and that are occupied by a PUCCH. After the terminal device receives the second indication information from the network device, even if the quantity A of the bits of the to-be-sent UCI is small, the terminal device still performs rate matching by using the N frequency domain resource units. In this case, because a length of an input bit to the rate matching is small, a redundant bit may be added during the rate matching, that is, a code rate may be reduced, so that transmission reliability of the UCI is improved.

In some other embodiments, when a sum of the quantity A of the bits of the UCI and a quantity of bits of a CRC corresponding to the UCI is less than or equal to a fourth threshold, the terminal device may perform rate matching by using the N frequency domain resource units, or in other words, send the UCI on the N frequency domain resource units.

In an example, the fourth threshold may be determined based on one or more of the following: N, a quantity of the subcarriers included in the frequency domain resource unit, a spreading factor corresponding to the first PUCCH format, a time unit quantity corresponding to the first PUCCH format, the modulation scheme corresponding to the first PUCCH format, or a first code rate.

For example, the fourth threshold, N, the quantity of the subcarriers included in the frequency domain resource unit, the spreading factor corresponding to the first PUCCH format, the time unit quantity corresponding to the first PUCCH format, the modulation scheme corresponding to the first PUCCH format, and the first code rate satisfy the following formula:

$$Thr_4 = (N-1)\cdot N_{sc,ctrl}\cdot N_{symb,UCI}^{PUCCH}\cdot Q_m\cdot r.$$

In other words, $$A + O'_{CRC} \le (N-1)\cdot N_{sc,ctrl}\cdot N_{symb,UCI}^{PUCCH}\cdot Q_m\cdot r.$$

$$E_{tot} = \frac{b\cdot N_{symb,UCI}^{PUCCH}}{N_{SF}^{PUCCH}}.$$

$O'_{CRC}$ is the quantity of bits of the CRC corresponding to the A-bit UCI. For physical meanings of other parameters, refer to the related descriptions in step S1202*a*. Details are not described herein again.

In some embodiments, a sum of the quantity A of the bits of the UCI and the quantity of bits of the CRC corresponding to the UCI is less than or equal to a maximum quantity P of bits that can be carried by the N frequency domain resource units. The maximum quantity P of bits may be configured by the network device, or may be agreed on in a protocol. This is not specifically limited in this application.

S1402*a*: Map the fifth modulation symbol to the N frequency domain resource units.

In some embodiments, a part of the fifth modulation symbol is mapped to each of the N frequency domain resource units.

S1403*a*: Send the fifth modulation symbol.

In some embodiments, the fifth modulation symbol may be included in a fifth signal. The terminal device may send the fifth signal to the network device. The fifth signal is carried by the N frequency domain resource units. In other words, the fifth signal is sent to the network device on the N frequency domain resource units.

Figure 14B:
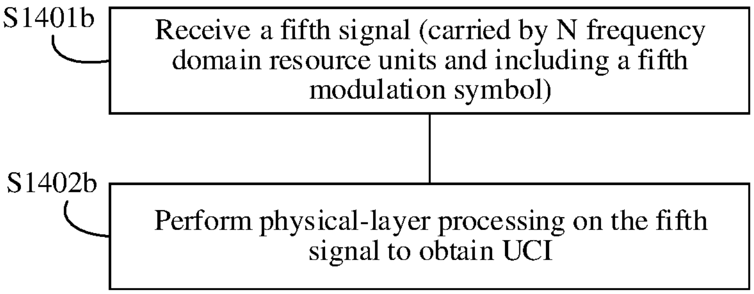
FIG. 14*b* is a schematic flowchart of receiving UCI by a network device according to this application.

When the terminal device sends the UCI in Manner 5, as shown in FIG. 14*b*, a receiving operation of the network device may include the following steps.

S1401*b*: Receive the fifth signal from the terminal device.

In an implementation, the fifth signal is carried by the N frequency domain resource units, and the fifth signal includes the fifth modulation symbol.

S1402*b*: Perform physical-layer processing on the fifth signal to obtain the UCI.

In an implementation, the physical-layer processing performed by the network device on the fifth signal matches the physical-layer processing performed by the terminal device on the A-bit UCI. Refer to the related descriptions in step S602*b*. Details are not described herein again.

In an implementation example, after obtaining the UCI, the network device may perform related processing based on the UCI. Refer to the related descriptions in step S602*b*. Details are not described herein again.

Based on this solution, one piece of UCI is sent on N frequency domain resources. During the rate matching, a redundant bit may be added to reduce a code rate, and transmission reliability can be improved, so that communication efficiency is improved.

It may be understood that, in the foregoing embodiments, the methods and/or the steps implemented by the network device may alternatively be implemented by a component (for example, a chip or a circuit) that may be used in the network device, and the methods and/or the steps implemented by the terminal device may alternatively be implemented by a component (for example, a chip or a circuit) that may be used in the terminal device.

The foregoing mainly describes, from the perspective of interaction between the devices, the solutions provided in this application. Correspondingly, this application further provides a communication apparatus, and the communication apparatus is configured to implement the foregoing methods. The communication apparatus may be the network device in the foregoing method embodiments, an apparatus including the network device, or a component that may be used in the network device. Alternatively, the communication apparatus may be the terminal device in the foregoing method embodiments, an apparatus including the terminal device, or a component that may be used in the terminal device.

It may be understood that, to implement the foregoing functions, the communication apparatus includes a corresponding hardware structure and/or software module for performing the functions. A person skilled in the art should be easily aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the functions for each particular application, but it should not be considered that the implementation goes beyond the scope of this application.

In embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example, and is merely logical function division. Another division manner may be used during actual implementation.

Figure 16:
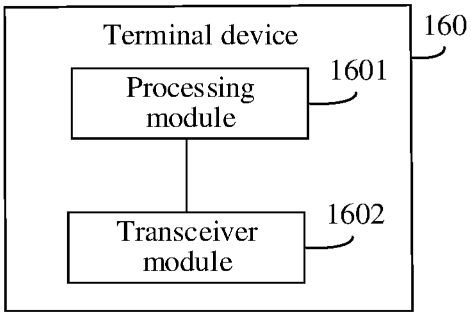
FIG. 16 is a schematic diagram of a structure of a terminal device according to this application.

In an implementation scenario, for example, the communication apparatus is the terminal device in the foregoing method embodiments. FIG. 16 is a schematic diagram of a structure of a terminal device 160. The terminal device 160 includes a processing module 1601 and a transceiver module 1602.

In some embodiments, the terminal device 160 may further include a storage module (not shown in FIG. 16), configured to store program instructions and data.

In some embodiments, the transceiver module 1602 may also be referred to as a transceiver unit, and is configured to implement a sending function and/or a receiving function. The transceiver module 1602 may include a transceiver circuit, a transceiver, or a communication interface.

In some embodiments, the transceiver module 1602 may include a receiving module and a sending module, respectively configured to perform the receiving and sending steps performed by the terminal in the foregoing method embodiments, and/or configured to support another process of the technology in this specification. The processing module 1601 may be configured to perform the processing (for example, determining or obtaining) step performed by the terminal in the foregoing method embodiments, and/or configured to support another process of the technology in this specification.

In an example:

the processing module 1601 is configured to determine uplink control information UCI; and the processing module 1601 is configured to send the UCI to a network device on N frequency domain resource units by using the transceiver module 1602, where N is a positive integer greater than 1.

In a possible implementation, the UCI includes N UCI subsegments, and different UCI subsegments in the N UCI subsegments are carried by different frequency domain resource units in the N frequency domain resource units.

In a possible implementation, a sum of a quantity of bits of the UCI subsegment and a quantity of bits of a cyclic redundancy check code CRC corresponding to the UCI subsegment is less than or equal to a first threshold, and the first threshold is a maximum quantity of bits that can be carried by the frequency domain resource unit.

In a possible implementation, that the processing module 1601 is configured to send the UCI on N frequency domain resource units by using the transceiver module 1602 includes:

The processing module 1601 is configured to perform physical-layer processing on the N UCI subsegments to obtain N first modulation symbols, where the physical-layer processing includes rate matching, and the rate matching is based on one frequency domain resource unit;

the processing module 1601 is further configured to map the N first modulation symbols to the N frequency domain resource units; and the transceiver module 1602 is configured to send the N first modulation symbols.

In a possible implementation, the UCI is mapped to the N frequency domain resource units X times, where X is a positive integer greater than 1.

In a possible implementation, X is equal to N, a quantity of bits of the UCI is A, and that the processing module 1601 is configured to send the UCI on N frequency domain resource units by using the transceiver module 1602 includes:

The processing module 1601 is configured to perform physical-layer processing on the A-bit UCI to obtain a second modulation symbol, where the physical-layer processing includes rate matching, and the rate matching is based on one frequency domain resource unit;

the processing module 1601 is further configured to separately map the second modulation symbol to each of the N frequency domain resource units; and the transceiver module 1602 is configured to send the second modulation symbol mapped to the frequency domain resource unit.

In a possible implementation, X is equal to N, a quantity of bits of the UCI is A, and that the processing module 1601 is configured to send the UCI on N frequency domain resource units by using the transceiver module 1602 includes:

The processing module 1601 is configured to perform physical-layer processing on N pieces of A-bit UCI to obtain N third modulation symbols, where the physical-layer processing includes rate matching, the rate matching is based on one frequency domain resource unit, and the N pieces of A-bit UCI is obtained by duplicating the A-bit UCI;

the processing module 1601 is further configured to map the N third modulation symbols to the N frequency domain resource units; and the transceiver module 1602 is configured to send the N third modulation symbols.

In a possible implementation, a sum of the quantity of bits of the UCI and a quantity of bits of a CRC corresponding to the UCI is less than or equal to a first threshold, and the first threshold is a maximum quantity of bits that can be carried by the frequency domain resource unit.

In a possible implementation, a quantity of bits of the UCI is A, and that the processing module 1601 is configured to send the UCI on N frequency domain resource units by using the transceiver module 1602 includes:

The processing module 1601 is further configured to perform physical-layer processing on first UCI to obtain a fourth modulation symbol, where the physical-layer processing includes rate matching, the rate matching is based on the N frequency domain resource units, the first UCI is obtained by duplicating the A-bit UCI, and the first UCI includes A times X bits;

the processing module 1601 is further configured to map the fourth modulation symbol to the N frequency domain resource units; and the transceiver module 1602 is configured to send the fourth modulation symbol.

In a possible implementation, a sum of the quantity of bits of the first UCI and a quantity of bits of a CRC corresponding to the first UCI is less than or equal to a second threshold; or a sum of the quantity of bits of the first UCI and a quantity of bits of a CRC corresponding to the first UCI is less than or equal to a smaller value in a second threshold and a third threshold, where the second threshold is determined based on one or more of the following: N, a quantity of subcarriers included in the frequency domain resource unit, a spreading factor corresponding to a first PUCCH format, a time unit quantity corresponding to the first PUCCH format, a modulation scheme corresponding to the first PUCCH format, or a first code rate, the first PUCCH format is a PUCCH format used when the UCI is sent, the first code rate is a code rate configured by the network device, and the third threshold is a preset threshold or a threshold configured by the network device.

In a possible implementation, the second threshold, N, the quantity of subcarriers included in the frequency domain resource unit, the spreading factor corresponding to the first PUCCH format, the time unit quantity corresponding to the first PUCCH format, the modulation scheme corresponding to the first PUCCH format, and the first code rate satisfy the following formula:

$$Thr_2 = N \cdot N_{sc,ctrl} \cdot N_{symb,UCI}^{PUCCH} \cdot Q_m \cdot r, \text{ where}$$

$Thr_2$ is the second threshold, $$N_{sc,ctrl} = N_{sc} / N_{SF}^{PUCCH},\ N_{sc}$$

is the quantity of subcarriers included in the frequency domain resource unit, $$N_{SF}^{PUCCH}$$

is the spreading factor corresponding to the first PUCCH format, $$N_{symb,UCI}^{PUCCH}$$

is the time unit quantity corresponding to the first PUCCH format, $Q_m$ is related to the modulation scheme corresponding to the first PUCCH format, and r is the first code rate.

In a possible implementation, the transceiver module 1602 is further configured to receive first indication information from the network device, where the first indication information indicates a value of X.

In a possible implementation, a quantity of bits of the UCI is A, and that the processing module 1601 is configured to send the UCI on N frequency domain resource units by using the transceiver module 1602 includes:

The processing module 1601 is configured to perform physical-layer processing on the A-bit UCI to obtain a fifth modulation symbol, where the physical-layer processing includes rate matching, and the rate matching is based on the N frequency domain resource units;

the processing module 1601 is further configured to map the fifth modulation symbol to the N frequency domain resource units; and the transceiver module 1602 is configured to send the fifth modulation symbol.

In a possible implementation, the transceiver module 1602 is further configured to receive second indication information from the network device, where the second indication information indicates that a quantity of frequency domain resource units for carrying the UCI is not less than N.

In a possible implementation, a value of N is a preset value; or the transceiver module 1602 is further configured to receive third indication information from the network device, where the third indication information indicates a value of N.

All related content of the steps in the foregoing method embodiments may be cited in function descriptions of the corresponding functional modules. Details are not described herein again.

In this application, the terminal device 160 is presented in a form of functional modules obtained through division in an integrated manner. The "module" herein may be an application-specific integrated circuit (ASIC), a circuit, a processor and a memory that execute one or more software or firmware programs, an integrated logic circuit, and/or another device that can provide the foregoing functions.

In some embodiments, in terms of hardware implementation, a person skilled in the art may figure out that the terminal device 160 may be in a form of the terminal device 30 shown in FIG. 3.

In an example, the processor 301 in the terminal 30 shown in FIG. 3 may invoke the computer-executable instructions stored in the memory 302, to implement a function/an implementation process of the processing module 1601 in FIG. 16, and the transceiver 303 in the terminal 30 shown in FIG. 3 may implement a function/an implementation process of the transceiver module 1602 in FIG. 16.

In some embodiments, when the terminal device 160 in FIG. 16 is a chip or a chip system, an input/output interface (or a communication interface) of the chip or the chip system may implement a function/an implementation process of the transceiver module 1602, and a processor (or a processing circuit) of the chip or the chip system may implement a function/an implementation process of the processing module 1601.

The terminal device 160 provided in this embodiment may perform the foregoing methods. Therefore, for a technical effect that can be achieved by the terminal device 160, refer to the foregoing method embodiments. Details are not described herein again.

Figure 17:
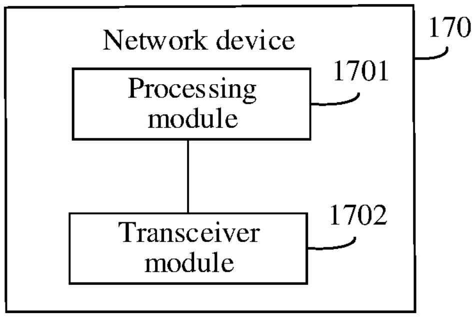
FIG. 17 is a schematic diagram of a structure of a network device according to this application.

In an implementation scenario, for example, the communication apparatus is the network device in the foregoing method embodiments. FIG. 17 is a schematic diagram of a structure of a network device 170. The network device 170 includes a processing module 1701 and a transceiver module 1702.

In some embodiments, the network device 170 may further include a storage module (not shown in FIG. 17), configured to store program instructions and data.

In some embodiments, the transceiver module 1702 may also be referred to as a transceiver unit, and is configured to implement a sending function and/or a receiving function. The transceiver module 1702 may include a transceiver circuit, a transceiver, or a communication interface.

In some embodiments, the transceiver module 1702 may include a receiving module and a sending module, respectively configured to perform the receiving and sending steps performed by the network device in the foregoing method embodiments, and/or configured to support another process of the technology in this specification. The processing module 1701 may be configured to perform the processing (for example, determining or obtaining) step performed by the network device in the foregoing method embodiments, and/or configured to support another process of the technology in this specification.

In an example:

the transceiver module 1702 is configured to receive a signal from a terminal device on N frequency domain resource units, where N is a positive integer greater than 1; and the processing module 1701 is configured to perform physical-layer processing on the signal to obtain uplink control information UCI.

In a possible implementation, the UCI includes N UCI subsegments, and different UCI subsegments in the N UCI subsegments are carried by different frequency domain resource units in the N frequency domain resource units.

In a possible implementation, a sum of a quantity of bits of the UCI subsegment and a quantity of bits of a cyclic redundancy check code CRC corresponding to the UCI subsegment is less than or equal to a first threshold, and the first threshold is a maximum quantity of bits that can be carried by the frequency domain resource unit.

In a possible implementation, the signal is a first signal, the first signal includes N first modulation symbols, and the first modulation symbol is a modulation symbol corresponding to the UCI subsegment.

In a possible implementation, the UCI is mapped to the N frequency domain resource units X times, where X is a positive integer greater than 1.

In a possible implementation, the signal is a second signal, X is equal to N, a quantity of bits of the UCI is A, the second signal includes N second modulation symbols, and the second modulation symbol is a modulation symbol corresponding to the A-bit UCI.

In a possible implementation, the signal is a third signal, X is equal to N, a quantity of bits of the UCI is A, the third signal includes N third modulation symbols, and the third modulation symbol is a modulation symbol corresponding to the A-bit UCI.

In a possible implementation, a sum of the quantity of bits of the UCI and a quantity of bits of a CRC corresponding to the UCI is less than or equal to a first threshold, and the first threshold is a maximum quantity of bits that can be carried by the frequency domain resource unit.

In a possible implementation, the signal is a fourth signal, a quantity of bits of the UCI is A, the fourth signal includes a fourth modulation symbol, the fourth modulation symbol is a modulation symbol corresponding to first UCI, the first UCI is obtained by duplicating the A-bit UCI, and the first UCI includes A times X bits.

In a possible implementation, a sum of the quantity of bits of the first UCI and a quantity of bits of a CRC corresponding to the first UCI is less than or equal to a second threshold; or a sum of the quantity of bits of the first UCI and a quantity of bits of a CRC corresponding to the first UCI is less than or equal to a smaller value in a second threshold and a third threshold, where the second threshold is determined based on one or more of the following: N, a quantity of subcarriers included in the frequency domain resource unit, a spreading factor corresponding to a first PUCCH format, a time unit quantity corresponding to the first PUCCH format, a modulation scheme corresponding to the first PUCCH format, or a first code rate, the first PUCCH format is a PUCCH format used when the UCI is sent, the first code rate is a code rate configured by a network device, and the third threshold is a preset threshold or a threshold configured by the network device.

In a possible implementation, the transceiver module 1702 is further configured to send first indication information to the terminal device, where the first indication information indicates a value of X.

In a possible implementation, the signal is a fifth signal, a quantity of bits of the UCI is A, the fifth signal includes a fifth modulation symbol, and the fifth modulation symbol is a modulation symbol corresponding to the A-bit UCI.

In a possible implementation, the transceiver module 1702 is further configured to send second indication information to the terminal device, where the second indication information indicates that a quantity of frequency domain resource units for carrying the UCI is not less than N.

In a possible implementation, a value of N is a preset value; or the transceiver module 1702 is further configured to send third indication information to the terminal device, where the third indication information indicates a value of N.

All related content of the steps in the foregoing method embodiments may be cited in function descriptions of the corresponding functional modules. Details are not described herein again.

In this application, the network device 170 is presented in a form of functional modules obtained through division in an integrated manner. The "module" herein may be an application-specific integrated circuit (ASIC), a circuit, a processor and a memory that execute one or more software or firmware programs, an integrated logic circuit, and/or another device that can provide the foregoing functions.

In some embodiments, in terms of hardware implementation, a person skilled in the art may figure out that the network device 170 may be in a form of the network device 20 shown in FIG. 3.

In an example, the processor 201 in the network device 20 shown in FIG. 3 may invoke computer-executable instructions stored in the memory 202, to implement a function/an implementation process of the processing module 1701 in FIG. 17, and the transceiver 203 in the network device 20 shown in FIG. 3 may implement a function/an implementation process of the transceiver module 1702 in FIG. 17.

In some embodiments, when the network device 170 in FIG. 17 is a chip or a chip system, an input/output interface (or a communication interface) of the chip or the chip system may implement a function/an implementation process of the transceiver module 1702, and a processor (or a processing circuit) of the chip or the chip system may implement a function/an implementation process of the processing module 1701.

The network device 170 provided in this embodiment may perform the foregoing methods. Therefore, for a technical effect that can be achieved by the network device 170, refer to the foregoing method embodiments. Details are not described herein again.

In a possible product form, the terminal device and the network device in embodiments of this application may be further implemented by using the following: one or more field programmable gate arrays (FPGAs), a programmable logic device (PLD), a controller, a state machine, gate logic, a discrete hardware component, any other suitable circuit, or any combination of circuits that can perform the functions in this application.

In some embodiments, an embodiment of this application further provides a communication apparatus. The communication apparatus includes a processor, configured to implement the method in any one of the foregoing method embodiments.

In a possible implementation, the communication apparatus further includes a memory. The memory is configured to store necessary program instructions and data. The processor may invoke program code stored in the memory, to indicate the communication apparatus to perform the method in any one of the foregoing method embodiments. Certainly, the communication apparatus may alternatively not include a memory.

In another possible implementation, the communication apparatus further includes an interface circuit. The interface circuit is a code/data read/write interface circuit, and the interface circuit is configured to receive computer-executable instructions (where the computer-executable instructions are stored in a memory, and may be directly read from the memory, or may be read via another component) and transmit the computer-executable instructions to the processor.

In still another possible implementation, the communication apparatus further includes a communication interface, and the communication interface is configured to communicate with a module outside the communication apparatus.

It may be understood that the communication apparatus may be a chip or a chip system. When the communication apparatus is the chip system, the communication apparatus may include a chip, or may include the chip and another discrete component. This is not specifically limited in this application.

In some embodiments, this application further provides a communication apparatus (where for example, the communication apparatus may be a chip or a chip system). The communication apparatus includes an interface circuit and a logic circuit. The interface circuit is configured to obtain to-be-processed information and/or output processed information. The logic circuit is configured to perform the method in any one of the foregoing method embodiments, to process the to-be-processed information and/or generate the processed information.

In a possible implementation, when the communication apparatus is configured to implement the functions of the terminal device:

In some possible designs, the processed information is uplink control information UCI.

In some possible designs, the to-be-processed information is first indication information, and the first indication information indicates a value of X.

In some possible designs, the to-be-processed information is second indication information, and the second indication information indicates that a quantity of frequency domain resource units for carrying the UCI is not less than N.

In a possible implementation, when the communication apparatus is configured to implement the functions of the network device:

In some possible designs, the to-be-processed information is uplink control information UCI.

In some possible designs, the processed information is first indication information, and the first indication information indicates a value of X.

In some possible designs, the processed information is second indication information, and the second indication information indicates that a quantity of frequency domain resource units for carrying the UCI is not less than N.

In a possible product form, the network device and the terminal device in embodiments of this application may be implemented by using a general bus architecture.

Figure 18:
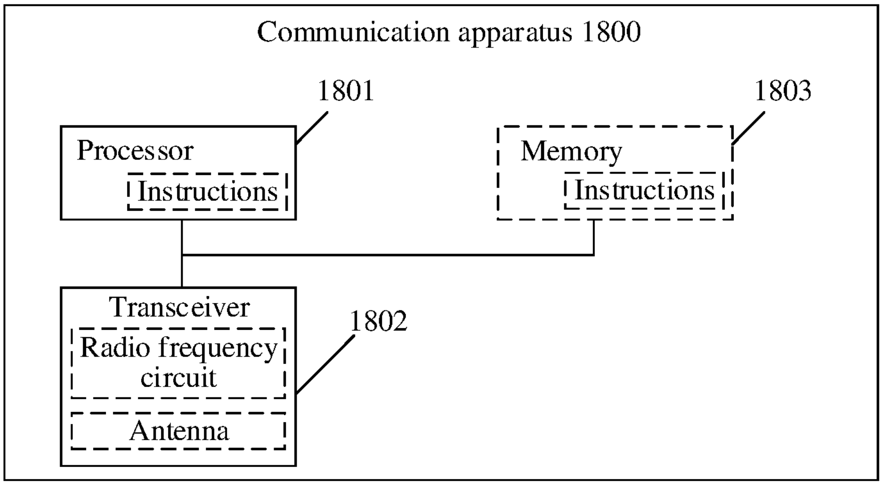
FIG. 18 is a schematic diagram of a structure of a communication apparatus according to this application.

For ease of description, FIG. 18 is a schematic diagram of a structure of a communication apparatus 1800 according to this application. The communication apparatus 1800 includes a processor 1801 and a transceiver 1802. The communication apparatus 1800 may be a network device, a terminal device, or a chip in the network device or the terminal device. FIG. 18 shows only main components of the communication apparatus 1800. In addition to the processor 1801 and the transceiver 1802, the communication apparatus may further include a memory 1803 and an input/output apparatus (not shown in the figure).

The processor 1801 is mainly configured to: process a communication protocol and communication data, control the entire communication apparatus, execute a software program, process data of the software program, and so on. The memory 1803 is mainly configured to store a software program and data. The transceiver 1802 may include a radio frequency circuit and an antenna. The radio frequency circuit is mainly configured to perform conversion between a baseband signal and a radio frequency signal and process the radio frequency signal. The antenna is mainly configured to send and receive a radio frequency signal in a form of an electromagnetic wave. The input/output apparatus, for example, a touchscreen, a display, or a keyboard, is mainly configured to receive data input by a user and output data to the user.

The processor 1801, the transceiver 1802, and the memory 1803 may be connected through a communication bus.

After the communication apparatus is powered on, the processor 1801 may read the software program in the memory 1803, interpret and execute instructions of the software program, and process the data of the software program. When data needs to be sent wirelessly, the processor 1801 performs baseband processing on to-be-sent data, and then outputs a baseband signal to the radio frequency circuit. The radio frequency circuit performs radio frequency processing on the baseband signal, and then sends, through the antenna, a radio frequency signal in an electromagnetic wave form. When data is sent to the communication apparatus, the radio frequency circuit receives a radio frequency signal through the antenna, converts the radio frequency signal into a baseband signal, and outputs the baseband signal to the processor 1801. The processor 1801 converts the baseband signal into data, and processes the data.

In another implementation, the radio frequency circuit and the antenna may be disposed independent of the processor that performs baseband processing. For example, in a distributed scenario, the radio frequency circuit and the antenna may be disposed remotely and independent of the communication apparatus.

This application further provides a computer-readable storage medium. The computer-readable storage medium stores a computer program or instructions. When the computer program or the instructions are executed by a computer, the function in any one of the foregoing method embodiments is implemented.

This application further provides a computer program product. When the computer program product is executed by a computer, the function in any one of the foregoing method embodiments is implemented.

A person of ordinary skill in the art may understand that, for the purpose of convenient and brief description, for a detailed working process of the foregoing system, apparatus, and unit, refer to a corresponding process in the foregoing method embodiments. Details are not described herein again.

It may be understood that the system, the apparatus, and the method in this application may alternatively be implemented in another manner. For example, the apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may be physically separated or not, this is, may be located together in the same place or distributed on a plurality of network units. Parts displayed as units may be or may not be physical units. Some or all of the units may be selected based on an actual requirement to achieve the objectives of the solutions in embodiments.

In addition, functional units in embodiments of this application may be integrated into one processing unit, or each of the units may exist alone physically, or two or more units may be integrated into one unit.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In embodiments of this application, the computer may include the foregoing apparatuses.

When the functions are implemented in the form of a software functional unit and sold or used as an independent product, the functions may be stored in a computer-readable storage medium. Based on such an understanding, the technical solutions in this application essentially, the part contributing to the prior art, or some of the technical solutions may be implemented in a form of a software product. The computer software product is stored in a computer-readable storage medium, and includes several instructions for instructing a computer device (which may be a personal computer, a server, a network device, or the like) to perform all or some of the steps of the methods in embodiments of this application. For the computer-readable storage medium, refer to the foregoing related descriptions. Details are not described herein.

Although this application is described with reference to embodiments herein, in a process of implementing this application that claims protection, a person skilled in the art may understand and implement another variation of the disclosed embodiments by viewing the accompanying drawings, disclosed content, and the accompanying claims. In the claims, "comprising" does not exclude another component or step, and "a" or "one" does not exclude a case of plurality. A single processor or another unit may implement several functions enumerated in the claims. Some measures are recorded in dependent claims that are different from each other, but this does not mean that the measures cannot be combined to produce a good effect.

Although this application is described with reference to specific features and embodiments thereof, it is clear that various modifications and combinations may be made to them without departing from the spirit and the scope of this application. Correspondingly, the specification and accompanying drawings are merely example descriptions of this application defined by the accompanying claims, and are considered as covering any of or all modifications, variations, combinations, or equivalents within the scope of this application. It is clear that a person skilled in the art can make various modifications and variations to this application without departing from the spirit and the scope of this application. This application is intended to cover these modifications and variations of this application provided that they fall within the scope of the claims of this application and their equivalent technologies.

What is claimed is:

1. A method, comprising:

determining uplink control information (UCI);

receiving indication information sent by a network device, wherein the indication information indicates N frequency domain resource units, and N is a positive integer greater than 1; and sending the UCI to the network device on the N frequency domain resource units using a physical uplink control channel (PUCCH) format 4 and on a band that is a shared and unlicensed frequency band, wherein the UCI is sent on the band according to a maximum transmit power associated with the band;

wherein the N frequency domain resource units are N resource blocks (RBs) occupied in frequency domain for the PUCCH format 4, and wherein the UCI is mapped to the N frequency domain resource units X times, where X is a positive integer greater than 1, and a value of X is indicated by first indication information received from the network device.

2. The method according to claim 1, wherein:

the UCI comprises N UCI subsegments, and different UCI subsegments in the N UCI subsegments are carried by different frequency domain resource units in the N frequency domain resource units.

3. The method according to claim 2, wherein:

a sum of a quantity of bits of a UCI subsegment of the N UCI subsegments and a quantity of bits of a cyclic redundancy check code (CRC) corresponding to the UCI subsegment is less than or equal to a first threshold, and the first threshold is a maximum quantity of bits which a frequency domain resource unit is sized to carry.

4. The method according to claim 2, wherein sending the UCI on the N frequency domain resource units comprises:

performing physical-layer processing on the N UCI subsegments to obtain N first modulation symbols, wherein:

the physical-layer processing comprises rate matching, and the rate matching is based on one frequency domain resource unit;

mapping the N first modulation symbols to the N frequency domain resource units; and sending the N first modulation symbols.

5. The method according to claim 1, wherein a quantity of bits of the UCI is A, and sending the UCI on the N frequency domain resource units comprises:

performing physical-layer processing on the A-bit UCI to obtain a fifth modulation symbol, wherein the physical-layer processing comprises rate matching, and the rate matching is based on the N frequency domain resource units;

mapping the fifth modulation symbol to the N frequency domain resource units; and sending the fifth modulation symbol.

6. The method according to claim 5, wherein a length E of an output bit sequence after the rate matching is determined based on $E_{tot}$; and when a modulation scheme corresponding to the PUCCH format 4 is quadrature phase shift keying (QPSK):

$$E_{tot} = \frac{a \cdot N \cdot N_{symb,UCI}^{PUCCH}}{N_{SF}^{PUCCH}};$$

or when the modulation scheme corresponding to the PUCCH format 4 is π/2 binary phase shift keying (BPSK):

$$E_{tot} = \frac{b \cdot N \cdot N_{symb,UCI}^{PUCCH}}{N_{SF}^{PUCCH}},$$

wherein $$N_{SF}^{PUCCH}$$

is a spreading factor corresponding to the PUCCH format 4, $$N_{symb,UCI}^{PUCCH}$$

is a time unit quantity corresponding to the PUCCH format 4, and a and b are positive numbers.

7. The method according to claim 5, wherein a sum of the quantity A of bits of the UCI and a quantity of bits of a CRC corresponding to the UCI is less than or equal to a maximum quantity of bits which the N frequency domain resource units are configured to carry.

8. A method, comprising:

sending indication information to a terminal device, wherein the indication information indicates N frequency domain resource units, and N is a positive integer greater than 1;

receiving a signal from the terminal device on the N frequency domain resource units and on a band that is a shared and unlicensed frequency band, wherein the signal is sent on the band according to a maximum transmit power associated with the band; and performing physical-layer processing on the signal to obtain uplink control information (UCI), wherein a physical uplink control channel (PUCCH) format corresponding to the UCI is a PUCCH format 4;

wherein the N frequency domain resource units are N resource blocks (RBs) occupied in frequency domain for the PUCCH format 4, and wherein the UCI is mapped to the N frequency domain resource units X times, where X is a positive integer greater than 1, and a value of X is indicated by first indication information received from a network device.

9. The method according to claim 8, wherein:

the UCI comprises N UCI subsegments, and different UCI subsegments in the N UCI subsegments are carried by different frequency domain resource units in the N frequency domain resource units.

10. The method according to claim 9, wherein:

a sum of a quantity of bits of a UCI subsegment of the N UCI subsegments and a quantity of bits of a cyclic redundancy check code CRC corresponding to the UCI subsegment is less than or equal to a first threshold, and the first threshold is a maximum quantity of bits which a frequency domain resource unit is sized to carry.

11. The method according to claim 8, wherein:

the signal is a first signal, the first signal comprises N first modulation symbols, and a first modulation symbol of the N first modulation symbols is a modulation symbol corresponding to a UCI subsegment.

12. The method according to claim 8, wherein:

a sum of a quantity of bits of the UCI and a quantity of bits of a CRC corresponding to the UCI is less than or equal to a first threshold, and the first threshold is a maximum quantity of bits which a frequency domain resource unit is sized to carry.

13. A communication apparatus, comprising:

at least one processor configured to execute instructions to enable the communication apparatus to:

determine uplink control information (UCI);

receive indication information sent by a network device, wherein the indication information indicates N frequency domain resource units, and N is a positive integer greater than 1; and send the UCI to the network device on the N frequency domain resource units using a physical uplink control channel (PUCCH) format 4 and on a band that is a shared and unlicensed frequency band, wherein the UCI is sent on the band according to a maximum transmit power associated with the band;

wherein the N frequency domain resource units are N resource blocks (RBs) occupied in frequency domain for the PUCCH format 4, and wherein the UCI is mapped to the N frequency domain resource units X times, where X is a positive integer greater than 1, and a value of X is indicated by first indication information received from the network device.

14. The communication apparatus according to claim 13, wherein:

the UCI comprises N UCI subsegments, and different UCI subsegments in the N UCI subsegments are carried by different frequency domain resource units in the N frequency domain resource units.

15. The communication apparatus according to claim 14, wherein:

a sum of a quantity of bits of the UCI subsegment and a quantity of bits of a cyclic redundancy check code (CRC) corresponding to the UCI subsegment is less than or equal to a first threshold, and the first threshold is a maximum quantity of bits which a frequency domain resource unit is sized to carry.

16. The communication apparatus according to claim 14, wherein, to send the UCI on the N frequency domain resource units, the at least one processor is further configured to execute the instructions to enable the communication apparatus to:

perform physical-layer processing on the N UCI subsegments to obtain N first modulation symbols, wherein:

the physical-layer processing comprises rate matching, and the rate matching is based on one frequency domain resource unit;

map the N first modulation symbols to the N frequency domain resource units; and send the N first modulation symbols.

17. The communication apparatus according to claim 13, wherein a quantity of bits of the UCI is A to obtain an A-bit UCI, and, to send the UCI on the N frequency domain resource units, the at least one processor is further configured to execute the instructions to enable the communication apparatus to:

perform, physical-layer processing on the A-bit UCI to obtain a fifth modulation symbol, wherein:

the physical-layer processing comprises rate matching, and the rate matching is based on the N frequency domain resource units;

map the fifth modulation symbol to the N frequency domain resource units; and send the fifth modulation symbol.

18. The communication apparatus according to claim 17, wherein a length E of an output bit sequence after the rate matching is determined based on $E_{tot}$; and when a modulation scheme corresponding to the PUCCH format 4 is quadrature phase shift keying (QPSK):

$$E_{tot} = \frac{a \cdot N \cdot N_{symb,UCI}^{PUCCH}}{N_{SF}^{PUCCH}};$$

or when the modulation scheme corresponding to the PUCCH format 4 is π/2 binary phase shift keying (BPSK):

$$E_{tot} = \frac{b \cdot N \cdot N_{symb,UCI}^{PUCCH}}{N_{SF}^{PUCCH}},$$

wherein $$N_{SF}^{PUCCH}$$

is a spreading factor corresponding to the PUCCH format 4, $$N_{symb,UCI}^{PUCCH}$$

is the time unit quantity corresponding to the PUCCH format 4, and a and b are positive numbers.

19. The communication apparatus according to claim 17, wherein a sum of the quantity A of bits of the UCI and a quantity of bits of a CRC corresponding to the UCI is less than or equal to a maximum quantity of bits which the N frequency domain resource units are configured to carry.

20. A communication apparatus, comprising:

at least one processor configured to execute instructions to enable the communication apparatus to:

send indication information to a terminal device, wherein the third indication information indicates N frequency domain resource units, and N is a positive integer greater than 1; and a transceiver module configured to:

receive a signal from the terminal device on the N frequency domain resource units and on a band that is a shared and unlicensed frequency band, wherein the transceiver module is configured to receive the signal sent on the band according to a maximum transmit power associated with the band; and perform physical-layer processing on the signal to obtain uplink control information (UCI), wherein a physical uplink control channel (PUCCH) format corresponding to the UCI is a PUCCH format 4;

wherein the N frequency domain resource units are N resource blocks (RBs) occupied in frequency domain for the PUCCH format 4, and wherein the UCI is mapped to the N frequency domain resource units X times, where X is a positive integer greater than 1, and a value of X is indicated by first indication information received from a network device.

21. The communication apparatus according to claim 20, wherein the UCI comprises N UCI subsegments, and different UCI subsegments in the N UCI subsegments are carried by different frequency domain resource units in the N frequency domain resource units.

22. The communication apparatus according to claim 21, wherein:

a sum of a quantity of bits of a UCI subsegment of the N UCI subsegments and a quantity of bits of a cyclic redundancy check code CRC corresponding to the UCI subsegment is less than or equal to a first threshold, and the first threshold is a maximum quantity of bits which a frequency domain resource unit is sized to carry.

23. The communication apparatus according to claim 20, wherein:

the signal is a first signal, the first signal comprises N first modulation symbols, and a first modulation symbol of the N first modulation symbols is a modulation symbol corresponding to a UCI subsegment.

24. The communication apparatus according to claim 20, wherein:

a sum of a quantity of bits of the UCI and a quantity of bits of a CRC corresponding to the UCI is less than or equal to a first threshold, and the first threshold is a maximum quantity of bits which a frequency domain resource unit is sized to carry.

* * * * *